(12) United States Patent
Leppänen et al.

(10) Patent No.: US 10,073,450 B2
(45) Date of Patent: Sep. 11, 2018

(54) METHOD AND APPARATUS FOR CAUSING SENDING OF A PARKING DIRECTIVE

(71) Applicant: Nokia Technologies Oy, Espoo (FI)

(72) Inventors: Jussi Leppänen, Tampere (FI); Antti Eronen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/104,336

(22) PCT Filed: Dec. 16, 2014

(86) PCT No.: PCT/FI2014/051008
§ 371 (c)(1),
(2) Date: Jun. 14, 2016

(87) PCT Pub. No.: WO2015/092134
PCT Pub. Date: Jun. 25, 2015

(65) Prior Publication Data
US 2016/0313731 A1 Oct. 27, 2016

(30) Foreign Application Priority Data
Dec. 20, 2013 (EP) .................... 13198689

(51) Int. Cl.
*G05D 1/00* (2006.01)
*G05D 3/00* (2006.01)
(Continued)

(52) U.S. Cl.
CPC .......... *G05D 1/0027* (2013.01); *B60K 35/00* (2013.01); *B60W 30/06* (2013.01); *B62D 15/027* (2013.01);
(Continued)

(58) Field of Classification Search
CPC ............ B60K 35/00; B60K 2350/1028; B60K 2350/1076; B60W 30/06; B62D 15/0265;
(Continued)

(56) References Cited

U.S. PATENT DOCUMENTS 8,868,329 B2* 10/2014 Ikeda .................... G01C 21/00
701/33.4
2002/0147543 A1* 10/2002 Gieseke .................. G08G 1/14
701/532
(Continued)

FOREIGN PATENT DOCUMENTS

DE 102010030208 A1 12/2011
DE 102010061904 A1 5/2012
(Continued)

OTHER PUBLICATIONS

Jung et al., "Semi-Automatic Parking System Recognizing Parking Lot Markings", The 8th International Symposium on Advanced Vehicle Control, Aug. 20-24, 2006, 6 pages.
(Continued)

*Primary Examiner* — Rachid Bendidi
(74) *Attorney, Agent, or Firm* — Alston & Bird LLP

(57) ABSTRACT

A method comprising identification of a parking region for a vehicle, identification of an object within the parking region, determination that sufficient space exists within the parking region for creation of a parking space, the parking space being a portion of the parking region that is dimensioned to allow the vehicle to enter the parking space and exit the parking space, determination of a parking directive based, at least in part, on the parking space and the object, and causation of sending the parking directive is disclosed.

19 Claims, 10 Drawing Sheets

(51) Int. Cl.
*G06F 7/00* (2006.01)
*G06F 17/00* (2006.01)
*B62D 15/02* (2006.01)
*B60K 35/00* (2006.01)
*B60W 30/06* (2006.01)
*G01C 21/36* (2006.01)
*G06K 9/00* (2006.01)

(52) U.S. Cl.
CPC ..... *B62D 15/0265* (2013.01); *B62D 15/0275* (2013.01); *B62D 15/0285* (2013.01); *G01C 21/3685* (2013.01); *B60K 2350/1028* (2013.01); *B60K 2350/1076* (2013.01); *G06K 9/00812* (2013.01)

(58) Field of Classification Search
CPC ............ B62D 15/0275; B62D 15/0285; G01C 21/3685; G05D 1/0027; G06K 9/00812
See application file for complete search history.

(56) References Cited

U.S. PATENT DOCUMENTS

| | | | | |
|---|---|---|---|---|
| 2007/0282499 | A1* | 12/2007 | Maeda | B60T 7/22 701/41 |
| 2008/0100472 | A1* | 5/2008 | Mizusawa | B60R 1/00 340/932.2 |
| 2009/0243888 | A1 | 10/2009 | Kawabata et al. | |
| 2010/0283634 | A1* | 11/2010 | Krautter | B60Q 9/004 340/932.2 |
| 2013/0060421 | A1 | 3/2013 | Kadowaki et al. | |
| 2013/0166190 | A1 | 6/2013 | Ikeda et al. | |
| 2013/0265429 | A1* | 10/2013 | Yoon | G08G 1/14 348/148 |
| 2013/0293369 | A1* | 11/2013 | Reilhac | B60Q 9/004 340/435 |
| 2013/0315443 | A1* | 11/2013 | Kim | G06K 9/00812 382/103 |
| 2014/0032048 | A1* | 1/2014 | Obradovich | B60R 16/0231 701/41 |
| 2015/0039173 | A1* | 2/2015 | Beaurepaire | B60W 30/06 701/23 |
| 2015/0291157 | A1* | 10/2015 | Beaurepaire | B60W 30/06 701/23 |
| 2016/0189435 | A1* | 6/2016 | Beaurepaire | G05D 1/021 705/13 |

FOREIGN PATENT DOCUMENTS

| | | |
|---|---|---|
| EP | 1864881 A1 | 12/2007 |
| JP | 2007-302065 A | 11/2007 |
| JP | 2009-205191 A | 9/2009 |
| JP | 2009220614 A | 10/2009 |
| JP | 2011-042356 A | 3/2011 |

OTHER PUBLICATIONS

Ohta et al., "Vehicle Class Recognition of Street-Parking Vehicles From Side-View Range Images", 12th World Congress on Intelligent Transport Systems, Nov. 2005, 6 pages.

"Parking Sensor", Wikipedia, Retrieved on Jun. 28, 2017, Webpage available at : https://en.wikipedia.org/wiki/Parking_sensor.

"Intelligent Parking Assist System", Wikipedia, Retrieved on Jun. 28, 2017, Webpage available at : https://en.wikipedia.org/wiki/Intelligent_Parking_Assist_System.

"Autonomous Car", Wikipedia, Retrieved on Jun. 29, 2017, Webpage available at : https://en.wikipedia.org/wiki/Autonomous_car.

"US Wants All Cars to Talk to Each Other With V2V technology", Designboom, Retrieved on Jun. 28, 2017, Webpage available at : http://www.designboom.com/technology/us-wants-all-cars-to-talk-to-each-other-with-v2v-technology/.

Office action received for corresponding European Patent Application No. 13198689.5, dated Apr. 4, 2016, 5 pages.

Office action received for corresponding Japanese Patent Application No. 2016-540026, dated May 30, 2017, 2 pages of office action and 3 pages of office action translation available.

Office action received for corresponding Japanese Patent Application No. 2016-540026, dated Jun. 19, 2017, 2 pages of office action and 3 pages of office action translation available.

International Search Report and Written Opinion received for corresponding Patent Cooperation Treaty Application No. PCT/FI2014/051008, dated Apr. 13, 2015, 10 pages.

European Search Report for EP Patent Application No. 13198689.5, dated May 8, 2014, 7 pages.

Office Action for Japanese Application No. 2016-540026 dated May 14, 2018, 4 pages.

\* cited by examiner

METHOD AND APPARATUS FOR CAUSING SENDING OF A PARKING DIRECTIVE

RELATED APPLICATION

This application was originally filed as Patent Cooperation Treaty Application No. PCT/FI2014/051008 filed Dec. 16, 2014 which claims priority benefit to European Patent Application No. 13198689.5 filed Dec. 20, 2013.

TECHNICAL FIELD

The present application relates generally to a parking directive.

BACKGROUND

Electronic apparatuses have become a major part of the lives of their users. Many users rely on their electronic apparatuses to aid in various aspects of the user's life. For example, users may utilize an electronic apparatus to search for information regarding a location, to plan a route to a location, and/or the like. In many circumstances, users may desire to drive a vehicle to such a location, and to temporarily park the vehicle while eating, shopping, etc. It may be desirable to provide an electronic apparatus that is configured to provide a simple and intuitive manner for users to locate an acceptable parking location.

SUMMARY

Various aspects of examples of the invention are set out in the claims.

One or more embodiments may provide an apparatus, a computer readable medium, a non-transitory computer readable medium, a computer program product, and a method for identification of a parking region for a vehicle, identification of an object within the parking region, determination that sufficient space exists within the parking region for creation of a parking space, the parking space being a portion of the parking region that is dimensioned to allow the vehicle to enter the parking space and exit the parking space, determination of a parking directive based, at least in part, on the parking space and the object, and causation of sending the parking directive.

One or more embodiments may provide an apparatus, a computer readable medium, a computer program product, and a non-transitory computer readable medium having means for identification of a parking region for a vehicle, means for identification of an object within the parking region, means for determination that sufficient space exists within the parking region for creation of a parking space, the parking space being a portion of the parking region that is dimensioned to allow the vehicle to enter the parking space and exit the parking space, means for determination of a parking directive based, at least in part, on the parking space and the object, and means for causation of sending the parking directive.

One or more embodiments may provide an apparatus, the apparatus comprising at least one processor and at least one memory, and the memory comprising machine-readable instructions, that when executed cause the apparatus to perform identification of a parking region for a vehicle, identification of an object within the parking region, determination that sufficient space exists within the parking region for creation of a parking space, the parking space being a portion of the parking region that is dimensioned to allow the vehicle to enter the parking space and exit the parking space, determination of a parking directive based, at least in part, on the parking space and the object, and causation of sending the parking directive.

In at least one example embodiment, the parking region is geographical area that is designated for parking of vehicles.

In at least one example embodiment, the parking region is geographical area that is suitable for parking of vehicles.

In at least one example embodiment, the parking space is dimensioned such that the vehicle may maneuver into the parking space and maneuver out of the parking space without obstruction.

One or more example embodiments further perform determination that the object is another vehicle that is movable based, at least in part, on the identity of the other vehicle.

In at least one example embodiment, the determination that sufficient space exists within the parking region for creation of the parking space is based, at least in part, on the determination that the other vehicle is movable.

In at least one example embodiment, the determination of the parking directive is further based, at least in part, on the determination that the other vehicle is movable.

In at least one example embodiment, the determination that the object is another vehicle that is movable comprises causation of sending of a vehicle movability query identifying the other vehicle to a server, and receipt of information indicative of movability of the other vehicle from the server.

In at least one example embodiment, the determination that the object is another vehicle that is movable comprises receipt of a vehicle movability query identifying the other vehicle from a client, determination of movability of the other vehicle based, at least in part, on the vehicle movability query, and causation of sending of information indicative of the movability of the other vehicle to the client.

In at least one example embodiment, the determination of the movability of the other vehicle is further based, at least in part, on vehicle movability data associated with the other vehicle.

In at least one example embodiment, the determination that the object is another vehicle that is movable comprises determination that the object is another vehicle that is movable within a vehicle move range associated with the other vehicle.

In at least one example embodiment, the vehicle move range associated with the other vehicle identifies a portion of the parking region in which the other vehicle may be caused to be positioned.

One or more example embodiments further perform identification of a parking space candidate as the parking space, wherein the determination of the parking directive is based, at least in part, on the identification of the parking space candidate as the parking space.

One or more example embodiments further perform causation of display of a representation of the parking space candidate in relation to a representation of a parking assistance interface, the representation of the parking space candidate indicating a location of the parking space in relation to the parking region.

One or more example embodiments further perform receipt of information indicative of a parking space candidate selection input associated with the representation of the parking space candidate, wherein the identification of the parking space candidate as the parking space is based, at least in part, on the parking space candidate selection input.

In at least one example embodiment, the representation of the parking space candidate comprises a representation of at least one vehicle move direction associated with the other vehicle.

In at least one example embodiment, the representation of the parking space candidate comprises a representation of at least one vehicle move direction associated with at least one vehicle parked at a position in the parking region that is adjacent to the parking space candidate.

In at least one example embodiment, the identification of the parking space candidate as the parking space comprises identification of a parking space candidate that corresponds with an unobstructed portion of the parking region, and identification of the parking space candidate as the parking space based, at least in part, on the correspondence with the unobstructed portion of the parking region.

In at least one example embodiment, the unobstructed portion of the parking region is larger than a different unobstructed portion of the parking region.

In at least one example embodiment, the identification of the parking space candidate as the parking space comprises determination of a parking directive candidate associated with the parking space candidate, and identification of the parking space candidate as the parking space based, at least in part, on the parking directive candidate.

In at least one example embodiment, the parking directive candidate indicates less movement than a different parking directive candidate associated with a different parking space candidate.

In at least one example embodiment, the object is another vehicle that is movable, and the parking directive is at least one of a parking space creation directive or a vehicle move directive.

In at least one example embodiment, the parking directive is a vehicle move directive, and the determination of the parking directive comprises determination of the vehicle move directive based, at least in part, on a vehicle move directive input associated with the other vehicle.

One or more example embodiments further perform receipt of information indicative of the vehicle move directive input associated with the other vehicle.

In at least one example embodiment, the vehicle move directive input is indicative of at least one of a vehicle move direction or a vehicle move distance.

One or more example embodiments further perform identification of a parking space candidate as the parking space, wherein the parking directive is a vehicle move directive, and determination of the parking directive comprises determination of the vehicle move directive based, at least in part, on the identification of the parking space candidate as the parking space.

One or more example embodiments further perform identification of a parking space candidate as the parking space, wherein the parking directive is a parking space creation directive, and determination of the parking directive comprises determination of the parking space creation directive based, at least in part, on the identification of the parking space candidate as the parking space.

One or more example embodiments further perform receipt of information indicative of a parking space candidate selection input that identifies a parking space candidate as the parking space, wherein the parking directive is a vehicle move directive, and determination of the parking directive comprises determination of the vehicle move directive based, at least in part, on the parking space candidate selection input that identifies the parking space candidate as the parking space.

In at least one example embodiment, the parking directive is a vehicle move directive, and the determination of the vehicle move directive occurs absent user action.

In at least one example embodiment, the determination of the parking directive comprises determination of a plurality of parking directives associated with creation of the parking space.

In at least one example embodiment, the identification of the object within the parking region comprises identification of a plurality of objects within the parking region.

One or more example embodiments further perform determination that at least one of the identified objects is another vehicle that is movable.

In at least one example embodiment, the object is another vehicle that is movable, the parking directive is a parking space creation directive, and the causation of sending the parking directive comprises causation of sending the parking space creation directive to a server.

In at least one example embodiment, the object is another vehicle that is movable, the parking directive is a vehicle move directive, and the causation of sending the parking directive comprises causation of sending the vehicle move directive.

In at least one example embodiment, the causation of sending the vehicle move directive comprises causation of sending the vehicle move directive to a server.

In at least one example embodiment, the causation of sending the vehicle move directive comprises causation of sending the vehicle move directive to a separate apparatus associated with the other vehicle.

In at least one example embodiment, the vehicle move directive comprises information indicative of a vehicle move request notification, the vehicle move request notification requesting a user of the other vehicle to move the other vehicle in conformance with the vehicle move directive.

In at least one example embodiment, the vehicle move directive comprises commands that cause the other vehicle to move in conformance with the vehicle move directive.

In at least one example embodiment, the vehicle move directive indicates at least one of a vehicle move direction or a vehicle move distance.

In at least one example embodiment, the determination of the parking directive comprises determination of a plurality of parking directives, and causation of sending of the parking directive comprises causation of sending of the plurality of parking directives.

One or more example embodiments further perform causation of display of a representation of a parking assistance wait notification based, at least in part, on the causation of sending of the parking directive.

In at least one example embodiment, the parking assistance wait notification is a notification that prompts a user of the vehicle to standby for creation of the parking space.

One or more example embodiments further perform determination that the parking space has been created.

In at least one example embodiment, the determination that the parking space has been created is based, at least in part, on information indicative of creation of the parking space.

One or more example embodiments further perform receipt of information indicative of creation of the parking space.

In at least one example embodiment, the information indicative of creation of the parking space is visual information indicative of the parking space, and the information indicative of creation of the parking space is received from a camera module.

In at least one example embodiment, the information indicative of creation of the parking space is received from a server.

In at least one example embodiment, the object is another vehicle that is movable, and determination that the parking space has been created is based, at least in part, on a location of the other vehicle.

One or more example embodiments further perform causation of display of a representation of a parking assistance park notification based, at least in part, on the determination that the parking space has been created.

In at least one example embodiment, the parking assistance park notification is a notification that prompts a user of the vehicle to park the vehicle in the parking space.

One or more example embodiments further perform causation of parking of the vehicle in the parking space based, at least in part, on the determination that the parking space has been created.

In at least one example embodiment, the causation of parking of the vehicle in the parking space comprises causation of maneuvering of the vehicle such that the vehicle is maneuvered into a position in the parking region that corresponds with the parking space.

One or more example embodiments further perform receipt of input indicative of a parking assistance interface invocation input.

In at least one example embodiment, the identification of the parking region for the vehicle is based, at least in part, on vehicle parking data.

In at least one example embodiment, the vehicle parking data is data received from at least one of a parking sensor, a proximity sensor, or a camera module.

One or more example embodiments further perform causation of display of a representation of a parking assistance interface based, at least in part, on the parking assistance interface invocation input.

One or more example embodiments further perform causation of display of a representation of the vehicle in relation to the parking assistance interface based, at least in part, on the parking assistance interface invocation input.

One or more example embodiments further perform causation of display of a representation of the other vehicle in relation to the parking assistance interface based, at least in part, on the parking assistance interface invocation input.

One or more example embodiments further perform causation of display of a representation of the parking region in relation to the parking assistance interface based, at least in part, on the parking assistance interface invocation input.

In at least one example embodiment, the identification of the parking region for the vehicle comprises receipt of information indicative of a position of the vehicle and identification of the parking region based, at least in part, on the proximity of the vehicle to the parking region.

In at least one example embodiment, the object is another vehicle.

In at least one example embodiment, the other vehicle is a vehicle that is parked in the parking region.

In at least one example embodiment, the identification of the object within the parking region comprises receipt of visual information indicative of the parking region, and identification of the object within the parking region based, at least in part, on the visual information indicative of the parking region.

In at least one example embodiment, the visual information indicative of the parking region is received from a camera module.

In at least one example embodiment, the camera module is comprised by the vehicle.

In at least one example embodiment, the visual information indicative of the parking region is received from a separate apparatus.

In at least one example embodiment, the identification of the object within the parking region is based, at least in part, on object identification data.

In at least one example embodiment, the identification of the object within the parking region comprises causation of sending a request for object identification data based, at least in part, on the object to a server, and receipt of information indicative of an identity of the object from the server.

In at least one example embodiment, the identification of the object within the parking region comprises receipt of a request for object identification data based, at least in part, on the object from a client, identification of the object within the parking region is based, at least in part, on the object identification data, and causation of sending of information indicative of an identity of the object to the client.

In at least one example embodiment, the identification of the object within the parking region comprises determination of an identity of the object based, at least in part, on the parking region and a location of the vehicle.

One or more example embodiments further perform causation of display of a representation of a vehicle move range, receipt of information indicative of a change of at least part of the representation of the vehicle move range, and causation of setting of at least part of the vehicle move range based, at least in part, on the change of the part of the representation of the vehicle move range.

In at least one example embodiment, a part of the vehicle move range indicates at least one of a vehicle move direction or a vehicle move distance.

In at least one example embodiment, a part of the vehicle move range indicates a vehicle move distance along a vehicle move direction, and a different part of the vehicle move range indicates a different vehicle move distance along a different vehicle move direction.

One or more example embodiments further perform causation of display of a representation of a different vehicle move range, receipt of information indicative of a change of the representation of the different vehicle move range, and causation of setting of the different vehicle move range based, at least in part, on the change of the representation of the different vehicle move range.

In at least one example embodiment, the vehicle move range is associated with a vehicle move direction, and the different vehicle move range is associated with a different vehicle move direction.

One or more example embodiments further perform sending of information indicative of the vehicle move range to a server.

In at least one example embodiment, the information indicative of the change of the representation of the vehicle move range is a drag input associated with at least part of the representation of the vehicle move range that indicates a change to at least part of the vehicle move range.

One or more example embodiments further perform determination that a portion of the parking region in which the vehicle is parked is dimensioned smaller than a parking space, and determination of a different parking directive that identifies the portion of the parking region to expand such that the portion of the parking region is dimensioned as a parking space.

One or more example embodiments further perform causation of sending of the different parking directive.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
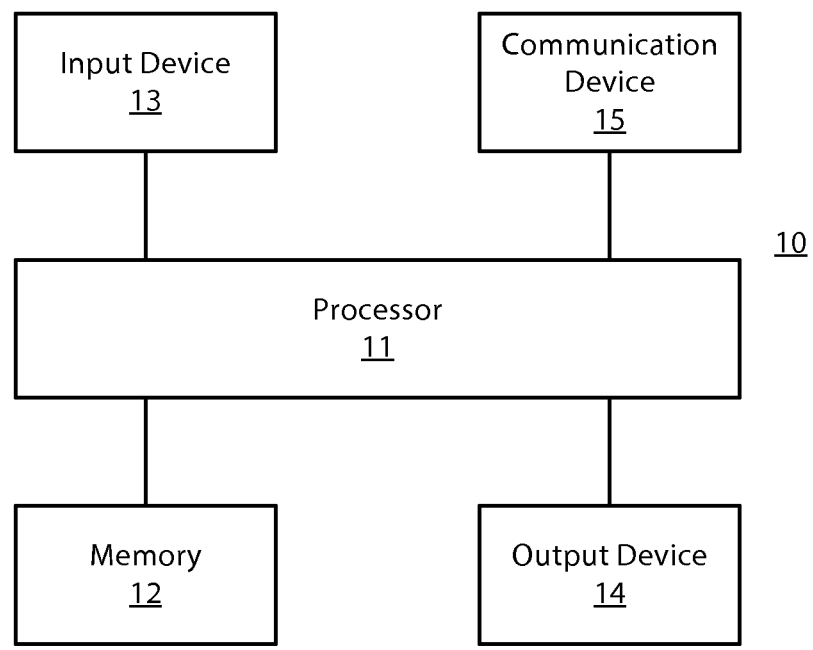
FIG. 1 is a block diagram showing an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, a navigation system in an automobile, a navigation system that is integrated into a central console of an automobile, a navigation system that is located in and/or removeably mounted to an automobile, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement.

The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image.

In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

In one or more example embodiments, electronic apparatus 10 comprises a positioning element. The positioning element may comprise satellite positioning circuitry. The satellite positioning circuitry may be any type of satellite positioning circuitry. For example, the satellite positioning circuitry may operate in accordance with Global Positioning System (GPS), Globalnaya Navigatsionnaya Sputnikovaya Sistema (GLONASS), Beidou, Galileo, and/or the like. In at least one example embodiment, the positioning element may be configured to determine a position of electronic apparatus 10 by way of terrestrial radio frequency signals, satellite signals, and/or the like. The radio frequency signals may be long range signals, cellular telephone signals, short range signals, Bluetooth signals, wireless location area network signals, and/or the like. In this regard, the positioning element may share some or all of its circuitry with one or more short range wireless transceivers comprised by electronic apparatus 10.

Figure 2:
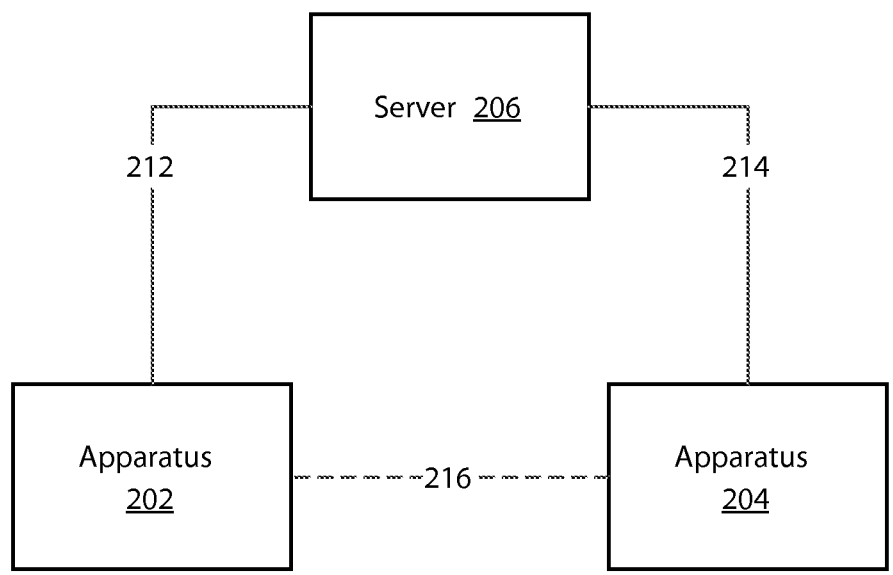
FIG. 2 is a block diagram showing apparatus communication according to at least one example embodiment.

FIG. 2 is a diagram illustrating apparatus communication according to at least one example embodiment. The example of FIG. 2 is merely an example and does not limit the scope of the claims. For example, communication paths may vary, apparatus count may vary, server count may vary, and/or the like.

FIG. 2 is a diagram illustrating apparatus communication according to at least one example embodiment. The example of FIG. 2 illustrates apparatus 202 in communication with server 206 by way of communication channel 212 and apparatus 204 in communication with server 206 by way of communication channel 214. It should be understood that, even though FIG. 2 illustrates communication channel 216 between apparatus 202 and apparatus 204, apparatus 202 and apparatus 204 may communicate indirectly via one or more separate apparatuses. For example, apparatus 202 may indirectly communicate with apparatus 204 via server 206 by way of communication channels 212 and 214, and apparatus 204 may indirectly communicate with apparatus 202 via server 206 by way of communication channels 214 and 212. For example, apparatus 202 may cause sending of information to apparatus 204 by way of communication channel 216, apparatus 202 may receive information from apparatus 204 by way of server 206, server 206 may receive information sent from apparatus 202, and/or the like.

It should be understood that, even though FIG. 2 illustrates a direct connection between apparatus 202 and server 206, and between apparatus 204 and server 206, there may be intermediate apparatuses that facilitate communication between apparatus 202 and server 206, and/or between apparatus 204 and server 206. For example, there may be one or more routers, hubs, switches, gateways, and/or the like, that are utilized in the communication channels between apparatus 202 and server 206, and/or between apparatus 204 and server 206. In addition, there may be other separate apparatuses that apparatus 202, apparatus 204, and/or server 206 are in communication with. For example, apparatus 202, apparatus 204, and/or server 206 may be in communication with a different server, another separate apparatus, and/or the like.

Figure 3A:
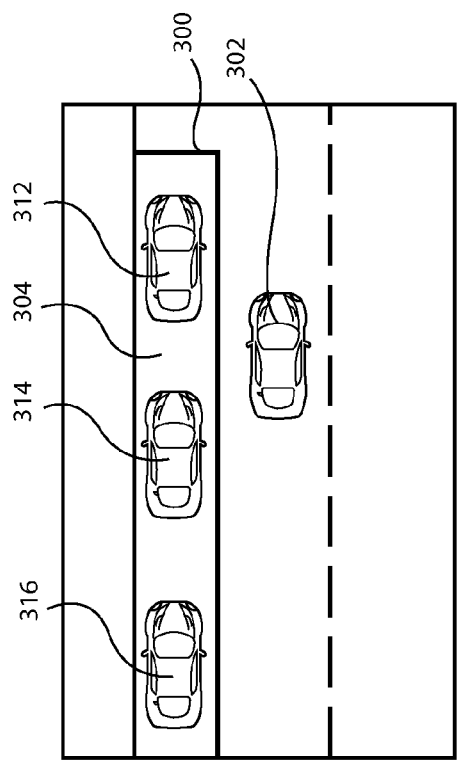
FIGS. 3A-3C are diagrams illustrating a parking space in a parking region according to at least one example embodiment.
Figure 3C:
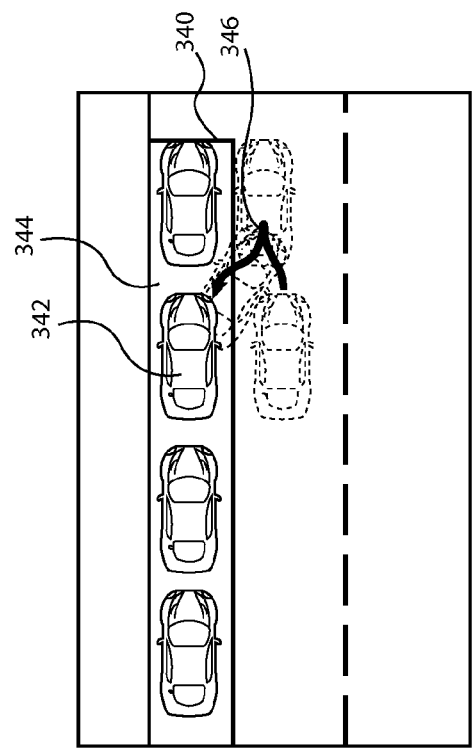
Figure 3B:
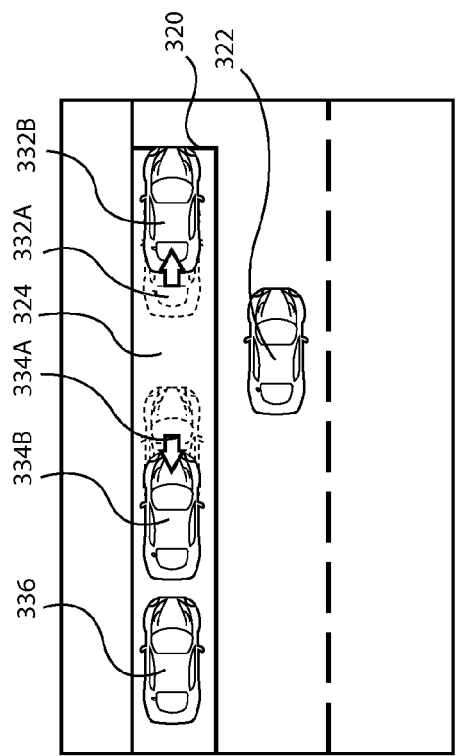

FIGS. 3A-3C are diagrams illustrating a parking space in a parking region according to at least one example embodiment. The examples of FIGS. 3A-3C are merely examples and do not limit the scope of the claims. For example, parking region configuration may vary, parking space configuration may vary, vehicle count may vary, and/or the like.

In many circumstances, user may enjoy traveling from a location to a different location that may not be within walking distance of the location. In such examples, the user may desire to drive a vehicle from the location to the different location. For example, the user may drive a vehicle from the user's home to a local store, to a theater, and/or the like. In such an example, the user will likely desire to temporarily park the vehicle while the user is eating, shopping, watching a performance, and/or the like. For example, the user may desire to park the user's vehicle in a parking region that is proximate to the location that the user desires to visit. In such an example, the parking region may be a geographical area that is designated for parking of vehicles, a spatial area that is suitable for parking of vehicles, a portion of paved roadway that is intended for parking of vehicle, and/or the likes. In at least one example embodiment, a parking region is a spatial region comprising one or more parking spaces, configurable to comprise one or more parking spaces, and/or the like.

In some circumstances, a parking region that is proximate to a location that the user desires to visit may not contain a parking space. For example, the parking region may be full of parked vehicles, the parked vehicles in the parking region may be distributed within the parking region such that the available space within the parking region is inefficiently divided, and/or the like. In at least one example embodiment, a parking space is a portion of the parking region that is dimensioned to allow the vehicle to enter the parking space and exit the parking space. For example, the parking space may be dimensioned such that the vehicle may maneuver into the parking space, maneuver out of the parking space, and/or the like, without obstruction and/or without interference with another vehicle that may be parked in the parking region. For example, a parking space must be large enough so as to allow a vehicle to park within the parking space, to maneuver into a position such that the vehicle is positioned entirely within the bounds of the parking space, and/or the like.

In some circumstances, a parking space may be dimensioned based on a vehicle, a customary standard, a governmental regulation, and/or the like. In at least one example embodiment, the dimensions of a parking space may be based, at least in part, on a vehicle that a user desires to have parked in the parking space. For example, a two-door coupe may be associated with a smaller parking space, and a large delivery lorry may be associated with a larger parking space. In at least one example embodiment, the dimensions of a parking space may be based, at least in part, on a standard parking space dimensions. For example, a local ordinance may define the standard parking space dimensions, city planning conventions may dictate the standard parking space dimensions, and/or the like.

FIG. 3A is a diagram illustrating a parking region according to at least one example embodiment. In the example of FIG. 3A, a user of vehicle 302 desires to park in parking region 300. Parking region 300 may be proximate to a location that the user is visiting, may be the only parking region in the vicinity, and/or the like. In the example of FIG. 3A, vehicles 312, 314, and 316 are parked within parking region 300. In the example of FIG. 3A, parking region 300 would have sufficient space for parking of vehicle 302 were it not for the positioning of vehicles 312, 314, and 316 within parking region 300. For example, vehicle 302 may be able to park in portion 304 of parking region 300 if vehicle 314 were parked at a position closer to vehicle 316, if vehicle 312 were parked at a position closer to the edge of parking region 300, and/or the like.

FIG. 3B is a diagram illustrating creation of a parking space in a parking region according to at least one example embodiment. The example of FIG. 3B depicts the scenario illustrated in FIG. 3A reflecting repositioning of vehicles 312 and 314 of FIG. 3A. In the example of FIG. 3B, vehicle 332A corresponds with vehicle 312 of FIG. 3A, and vehicle 334A corresponds with vehicle 314 of FIG. 3A. In the example of FIG. 3B, the position of vehicle 332B indicates a new position of vehicle 332A, and the position of vehicle 334B indicates a new position of vehicle 334A. In the example of FIG. 3B, vehicle 336 corresponds with vehicle 316 of FIG. 3A, and remains at the same position relative to parking region 320. In the example of FIG. 3B, portion 324 corresponds with portion 304 of FIG. 3A. In the example of FIG. 3A, portion 304 is dimensioned smaller than a parking space such that vehicle 302 is precluded from parking in portion 304 of parking region 300. In the example of FIG. 3B, portion 324 has increased in size due to the repositioning of vehicles 312 and 314 of FIG. 3A, as indicated by vehicles 332B and 334B. For example, portion 324 may be dimensioned such that portion 324 is a parking space. In such an example, portion 324 may be dimensioned so as to allow vehicle 322 to enter portion 324, exit portion 324, and/or the like.

FIG. 3C is a diagram illustrating parking a vehicle in a parking space in a parking region according to at least one example embodiment. The example of FIG. 3C depicts the scenario illustrated in FIG. 3B subsequent to parking of vehicle 322 in portion 324. In the example of FIG. 3C, vehicle 342 corresponds with vehicle 322 of FIG. 3B, and parking space 344 corresponds with portion 324 of FIG. 3B. As illustrated in FIG. 3C, vehicle 342 performs parking maneuver 346 such that vehicle 342 is parked in parking space 344 of parking region 340. For example parking maneuver 346 may be a parallel parking maneuver such that vehicle 342 is positioned within parking space 344 without obstruction, without interfering with another vehicle in parking region 340, and/or the like.

FIGS. 4A-4E are diagrams illustrating creation of a parking space in a parking region according to at least one example embodiment. The examples of FIGS. 4A-4E are merely examples and do not limit the scope of the claims. For example, parking region configuration may vary, parking space configuration may vary, vehicle count may vary, parking assistance interface configuration may vary, and/or the like.

As previously discussed, in many circumstances, users may desire to drive a vehicle to a location, and to temporarily park the vehicle while eating, shopping, etc. In some situations, it may be desirable to facilitate parking of a vehicle by way of one or more electronic apparatuses. For example, as described regarding FIGS. 3A-3C, in many circumstances, a parking region may contain sufficient available space for a parking space for a vehicle but for positioning of other vehicles within the parking region, inefficient distribution of available space between the other vehicles, and/or the like. It may be desirable to provide an electronic apparatus that is configured to provide a simple and intuitive manner for users to locate and/or create an acceptable parking location.

In at least one example embodiment, an apparatus receives input indicative of a parking assistance interface invocation input. The parking assistance interface invocation input may be an input that indicates a desire of a user of the apparatus to cause display of a parking assistance interface, to receive assistance related to parking of a vehicle, and/or the like. For example, a user may utilize an electronic apparatus to guide the user to a particular location. In such an example, once proximate to the location, the user may desire assistance in location of a parking space that may be suitable for parking of the user's vehicle.

Figure 4A:
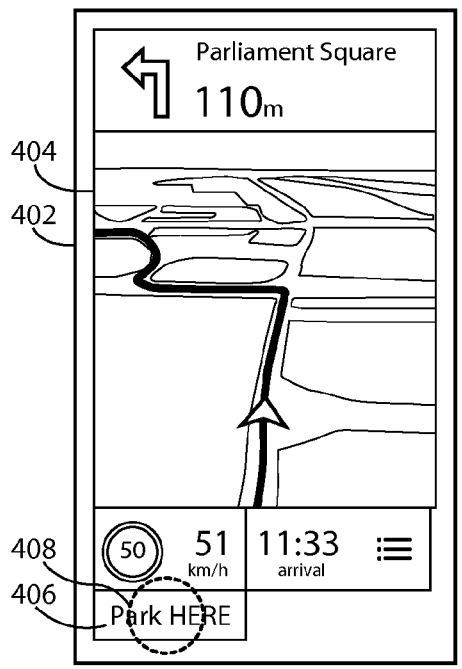
FIGS. 4A-4E are diagrams illustrating a parking assistance interface according to at least one example embodiment.

FIG. 4A is a diagram illustrating invocation of a parking assistance interface according to at least one example embodiment. The example of FIG. 4A depicts display of navigation interface 404 on display 402. Navigation interface 404 may indicate that the user of a vehicle is proximate to a location that the user is driving to, that the vehicle is proximate to a specific destination, and/or the like. In the example of FIG. 4A, input 408 is a parking assistance interface invocation input associated with button 406. For example, receipt of an input associated with button 406 may cause invocation of a parking assistance interface.

In many circumstances, it may be desirable to provide a user with an understandable and intuitive interface for utilization of parking assistance functionality associated with an electronic apparatus. For example, it may be desirable to allow a user to quickly make informed parking decisions, to quickly locate and park in a parking space, to reduce the amount of time associated with searching for a parking space, and/or the like. For example, a user may desire to perceive a representation indicative of a spatial arrangement of a parking region, of objects within the parking region, of other vehicles within the parking region, of available space within the parking region, and/or the like.

In at least one example embodiment, an apparatus causes display of a representation of a parking assistance interface based, at least in part, on the parking assistance interface invocation input. In at least one example embodiment, the parking assistance interface is a visual representation of a spatial area surrounding the vehicle, proximate to the vehicle, corresponding with the parking region and/or the vehicle, and/or the like. In order to facilitate understanding of the spatial relationship between the parking region, the vehicle, and/or objects within the parking region, it may be desirable to display a representation of the vehicle, one or more objects that may be positioned within the parking region, and/or the like, in relation to the representation of the parking region and the parking assistance interface.

In at least one example embodiment, an apparatus causes display of a representation of a parking region based, at least in part, on the parking assistance interface invocation input. In at least one example embodiment, an apparatus causes display of a representation of the vehicle in relation to the parking assistance interface based, at least in part, on the parking assistance interface invocation input. In at least one example embodiment, an apparatus causes display of a representation of an object in relation to the parking assistance interface based, at least in part, on the parking assistance interface invocation input. In at least one example embodiment, an object is a physical object that occupies at least a portion of a parking region. An object may be a vehicle, a planter, an obstruction, a motorcycle, a bicycle rack, a post, and/or the like. In at least one example embodiment, an object is another vehicle. In such an example embodiment, an apparatus may cause display of a representation of the other vehicle in relation to the parking assistance interface based, at least in part, on the parking assistance interface invocation input.

Figure 4B:
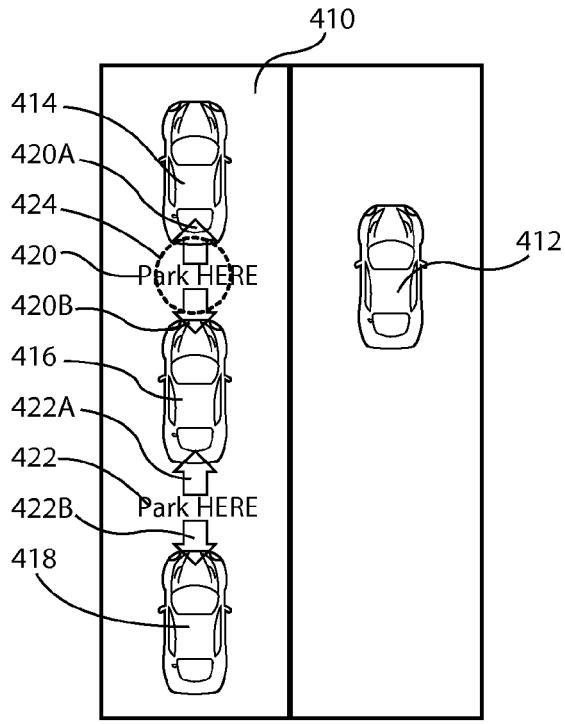
Figure 4C:
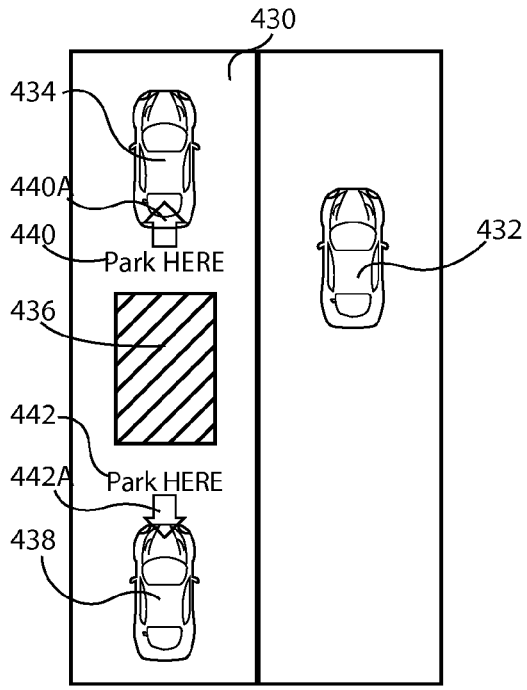

FIG. 4B is a diagram illustrating selection of a parking space candidate in a parking assistance interface according to at least one example embodiment. In the example of FIG. 4B, a user of vehicle 412 desires to park in parking region 410. In the example of FIG. 4B, vehicles 414, 416, and 418 are parked within parking region 410. FIG. 4C is a diagram illustrating a parking assistance interface according to at least one example embodiment. In the example of FIG. 4C, a user of vehicle 432 desires to park in parking region 430. In the example of FIG. 4C, vehicles 434 and 438 are parked within parking region 430, and object 436 is an object that is occupying a portion of parking region 430 such that object 436 is an obstruction to vehicle 432.

In order to facilitate parking of a vehicle in a parking region, it may be desirable to identify a parking region that may be suitable for parking of the vehicle. For example, it may be desirable for an apparatus to identify a location of a parking region, to determine a size and/or configuration of a parking region, and/or the like.

In at least one example embodiment, an apparatus identifies a parking region for a vehicle. In many circumstances, it may be desirable to identify a parking region that is at a location proximate to a location of a vehicle. For example, the user of the vehicle may desire to park in a parking region that is close to a store that the user desires to visit. In at least one example embodiment, the identification of the parking region for the vehicle comprises receipt of information indicative of a position of the vehicle. In such an example embodiment, the identification of the parking region may be based, at least in part, on the proximity of the vehicle to the parking region. For example, as depicted in FIG. 4B, parking region 410 may have been identified based, at least in part, on the proximity of parking region 410 to a position of vehicle 412, a location of vehicle 412 in relation to a different parking region that may be further from vehicle 412 and/or the like. For example, as depicted in FIG. 4C, parking region 430 may have been identified based, at least in part, on the proximity of parking region 430 to a position of vehicle 432, a location of vehicle 432 in relation to a different parking region that may be further from vehicle 432, and/or the like.

In some circumstances, it may be desirable to base identification of a parking region on information indicative of objects within the parking region, available space within the parking region, a configuration of the parking region, and/or the like. In at least one example embodiment, identification of a parking region for a vehicle is based, at least in part, on vehicle parking data. Vehicle parking data may comprise information indicative of a vehicle being parked within a parking region, at a specific location within the parking region, and/or the like. For example, a separate apparatus associated with a vehicle parked in a parking region may cause sending of vehicle parking data indicative of the vehicle being parked at a position within the parking region. In at least one example embodiment, an apparatus receives vehicle parking data. For example, the vehicle parking data may be received from a parking sensor, a vehicle, a separate apparatus associated with a vehicle, a proximity sensor, a camera module, a repository of vehicle parking data, and/or the like. For example, a parking region may be identified based, at least in part, on visual information indicative of the parking region from a camera module. The camera module may be comprised by the apparatus, comprised by a separate apparatus associated with the apparatus, and/or the like. In another example, a parking region may be identified based, at least in part, on proximity sensor information received from a proximity sensor. In at least one example embodiment, an apparatus is in communication with one or more proximity sensors. The proximity sensor may be a radar sensor, a camera sensor, an ultrasonic sensor, a laser sensor, a rangefinder sensor, and/or the like. For example, the proximity sensor may be positioned at a location on a vehicle and may be used to measure distances from the vehicle to nearby objects. In at least one example embodiment, vehicle parking data is received from a vehicle parking data repository. For example, the vehicle parking data repository may comprise information indicative of locations of a plurality of parking regions, configurations of a plurality of parking regions, available space within a plurality of parking regions, locations and/or dimensions of vehicles that may be parked at positions within the plurality of parking regions, and/or the like.

For example, as illustrated in FIG. 4B, parking region 410 may be identified based, at least in part, on vehicle parking data associated with parking region 410, vehicles 414, 416, or 418, and/or the like. For example, vehicle 412 may comprise a camera module, and identification of parking region 410 may be based, at least in part, on visual information indicative of parking region 410 received from the camera module. In another example, as illustrated in FIG. 4C, parking region 430 may be identified based, at least in part, on vehicle parking data associated with parking region 430, vehicles 434 or 438, and/or the like. For example, vehicle 438, or a separate apparatus associated with vehicle 438, may have communicated information indicative of the position of vehicle 438, the parking region in which vehicle 438 is parked, and/or the like. In such an example, an apparatus may identify parking region 430 based, at least in part, on the vehicle parking data communicated by vehicle 438, a repository of vehicle parking data indicative of the locations of and/or the configurations of a plurality of parking regions, and/or the like.

As described previously, in many circumstances, it may be desirable to identify objects that may be occupying at least a portion of a parking region. For example, it may be desirable for purposes relating to display of a representation of a spatial arrangement of a parking region, facilitation of assistance with parking of a vehicle in a parking region, and/or the like. In at least one example embodiment, an apparatus identifies an object within the parking region. The object may be a vehicle, a planter, an obstruction, a motorcycle, a bicycle rack, a post, and/or the like. In at least one example embodiment, an object is another vehicle that is parked in a parking region. In at least one example embodiment, identification of an object within a parking region comprises receipt of visual information indicative of the parking region. In such an example embodiment, identification of the object within the parking region may be based, at least in part, on the visual information indicative of the parking region. In at least one example embodiment, visual information indicative of the parking region is received from a camera module. The camera module may be a side facing camera module, a rear facing camera module, a panoramic camera module, a roof mounted camera module, and/or the like, such that a capture region of the camera module at least partially corresponds with a direction associated with the parking region, the object, and/or the like. In at least one example embodiment, the camera module is comprised by the vehicle. In at least one example embodiment, the camera module is comprised by a separate apparatus associated with the vehicle. For example, the separate apparatus may be a camera module apparatus, an electronic apparatus of a user of the vehicle, a server, and/or the like. In such an example embodiment, the visual information indicative of the parking region may be received from the separate apparatus associated with the vehicle.

In many situations, it may be desirable to determine a specific identity of a particular object. As described previously, in some circumstances, a parking region may contain sufficient available space for a parking space for a vehicle but for positioning of other vehicles within the parking region, inefficient distribution of available space between the other vehicles, and/or the like. In such circumstances, it may be desirable to identify at least one of the other vehicles that may be parked in the parking region. For example, it may be desirable to identify the other vehicle in order to facilitate parking of the vehicle in the parking region.

In at least one example embodiment, identification of an object within a parking region is based, at least in part, on object identification data. In at least one example embodiment, object identification data is information indicative of an identity of an object. For example, the object identification data may identify an object as a vehicle, may identify an owner of a vehicle, may identify characteristics associated with the object such as size, configuration, etc., and/or the like. In some circumstances, object identification data may be associated with a server. For example, the server may be associated with an object identification data repository comprising information indicative of the identities of a plurality of objects. In at least one example embodiment, identification of an object within a parking region comprises causation of sending a request for object identification data based, at least in part, on the object to a server. In at least one example embodiment, an apparatus receives information indicative of an identity of the object from a server. For example, the apparatus may receive object identification data, information indicative of an identity of the object, and/or the like. In at least one example embodiment, an apparatus receives a request for object identification data based, at least in part, on an object from a client. In such an example embodiment, an apparatus may be a server, and a client may be a separate apparatus that is interfacing with the server. In such an example embodiment, an apparatus may identify the object within the parking region based, at least in part, on the object identification data, and may cause sending of information indicative of the identity of the object to the client. In at least one example embodiment, identification of an object within a parking region is based, at least in part, on the parking region and a location of the vehicle. For example, the parking region and/or the location of the vehicle may be associated with an object with a known identity, an identifiable identity, a determinable identity, and/or the like. For example, a location of an object may be registered such that the identity of the object, the location of the object, and/or the like, is associated with a specific location, a specific parking region, a particular location within a parking region, and/or the like.

As described previously, a parking region may contain sufficient available space for a parking space for a vehicle but for positioning of other vehicles within the parking region, inefficient distribution of available space between the other vehicles, and/or the like. In such situations, a user may desire that objects, such as vehicles, within the parking region are configured such that a parking space is created such that the user may park the user's vehicle in the parking region. In many circumstances, a user may desire to reconfigure an arrangement of objects within a parking region in a manner that is quick and convenient to the user, the user of the other vehicles, and/or the like. For example, at least one of the other vehicles may be movable such that available space within the parking region may be reconfigured into a parking space for the vehicle, reapportioned such that a parking space is created, and/or the like.

In at least one example embodiment, an apparatus determines that an object is another vehicle. In such an example embodiment, the apparatus may determine that the other vehicle is movable based, at least in part, on the identity of the other vehicle. In at least one example embodiment, a vehicle that is movable is a vehicle that may be caused to be repositioned from a position within a parking region and to a different position within the parking region. In at least one example embodiment, an apparatus determines that an object is another vehicle that is movable within a vehicle move range associated with the other vehicle. The vehicle move range associated with the other vehicle may, for example, identify a portion of the parking region in which the other vehicle may be caused to be positioned, to be caused to be moved to, and/or the like.

In many circumstances, it may be desirable to maintain information indicative of the movability of an object on a server, for example, in order to facilitate dissemination of such information, review of such information, and/or the like. In at least one example embodiment, an apparatus sends a vehicle movability query identifying a vehicle to a server. In such an example embodiment, the apparatus may receive information indicative of the movability of the vehicle from the server. In at least one example embodiment, an apparatus is a server. In such an example embodiment, the apparatus may receive a vehicle movability query identifying the other vehicle from a client. The apparatus may determine movability of the other vehicle based, at least in part, on the vehicle movability query, and may cause sending of information indicative of the movability of the other vehicle to the client. In at least one example embodiment, an apparatus determines movability of another vehicle based, at least in part, on vehicle movability data associated with the other vehicle. For example, vehicle movability data may comprise information indicative of a capability of the vehicle to be caused to be moved, a vehicle move range, and/or the like. The vehicle move range may be similar as described regarding FIGS. 5A-5B.

In order to facilitate creation of a parking space for a vehicle, it may be desirable to determine that sufficient space exists within the parking region for creation of the parking space. For example, it may be desirable to determine that a cumulative amount of available space within the parking region permits creation of a parking space, permits creation of a parking space while maintaining another parking space for another vehicle, allows for sufficient movement of another vehicle that is movable such that a parking space is created, and/or the like. In at least one example embodiment, the determination that sufficient space exists within the parking region for creation of the parking space is based, at least in part, on the determination that an object is another vehicle that is movable. In such an example embodiment, the determination that sufficient space exists within the parking region for creation of the parking space may be further based, at least in part, that there is sufficient space within the parking region for creation of the parking space by way of movement of the other vehicle.

In some circumstances, objects within a parking region may be reconfigured such that a parking space may be created at a position within the parking region, more than one position within the parking region, and/or the like. In such circumstances, a user may desire the ability to select a specific parking space for parking of the user's vehicle. For example, the user may desire to park in a specific portion of the parking region based on shade, tree coverage, and/or the like. In at least one example embodiment, an apparatus identifies a parking space candidate. A parking space candidate may be a parking space that may be caused to be created for the vehicle to park in.

As described previously, in many circumstances, a user may desire to perceive a representation of a spatial arrangement of a parking region, an area proximate to the parking region, and/or the like. In at least one example embodiment, an apparatus causes display of a representation of the parking space candidate in relation to a representation of a parking assistance interface. The representation of the parking space candidate may indicate a location of the parking space in relation to the parking region. In at least one example embodiment, a representation of a parking space candidate comprises a representation of at least one vehicle move direction associated with another vehicle that is parked within the parking region. For example, the representation of the parking space candidate may comprise a representation of at least one vehicle move direction associated with at least one vehicle parked at a position in the parking region that is adjacent to the parking space candidate.

In the example of FIG. 4B, vehicles 414, 416, and 418 are parked within parking region 410. Parking space candidates 420 and 422 are representations of parking space candidates located at positions between vehicles 414 and 416, and between vehicles 416 and 418, respectively. Parking space candidate 420 comprises vehicle move directions 420A and 420B, and parking space candidate 422 comprises vehicle move directions 422A and 422B. In the example of FIG. 4B, vehicle move directions 420A, 420B, 422A, and 422B are representations of vehicle move directions associated with vehicles adjacent to the representations of the vehicle move directions.

In the example of FIG. 4B, vehicles 414, 416, and 418 are vehicles that have been determined to be movable, as indicated by the various representations of vehicle move directions. For example, vehicle 414 may have been determined to be movable in a direction indicated by vehicle move direction 420A, vehicle 416 may have been determined to be movable in a direction indicated by vehicle move direction 420B and vehicle move direction 422A, and vehicle 418 may have been determined to be movable in a direction indicated by vehicle move direction 422B. For example, vehicle move direction 420A may indicate that a parking space for vehicle 412 may be created by way of moving vehicle 414 in the direction indicated by vehicle move direction 420A. Vehicle move direction 420B may indicate that a parking space for vehicle 412 may be created by way of moving vehicle 416 in the direction indicated by vehicle move direction 420B. Vehicle move direction 422A may indicate that a parking space for vehicle 412 may be created by way of moving vehicle 416 in the direction indicated by vehicle move direction 422A. Vehicle move direction 422B may indicate that a parking space for vehicle 412 may be created by way of moving vehicle 418 in the direction indicated by vehicle move direction 422B.

In the example of FIG. 4C, vehicles 434 and 438 are parked within parking region 430. Parking space candidates 440 and 442 are representations of parking space candidates located at positions between vehicle 434 and object 436, and between object 436 and vehicle 438, respectively. In the example of FIG. 4C, object 436 is an object that is determined to be not movable. Parking space candidate 440 comprises vehicle move direction 440A, and parking space candidate 442 comprises vehicle move direction 442A. In the example of FIG. 4C, vehicle move directions 440A and 442A are representations of vehicle move directions associated with vehicles adjacent to the representations of the vehicle move directions. For example, vehicle 343 may not be movable in a direction opposite of the direction indicated by vehicle move direction 440A based, at least in part, on presence of unmovable object 436 adjacent to vehicle 343 in the opposite direction.

In the example of FIG. 4C, vehicles 434 and 438 are vehicles that have been determined to be movable, as indicated by the various representations of vehicle move directions. For example, vehicle 434 may have been determined to be movable in a direction indicated by vehicle move direction 440A, and vehicle 438 may have been determined to be movable in a direction indicated by vehicle move direction 442A. For example, vehicle move direction 440A may indicate that a parking space for vehicle 432 may be created by way of moving vehicle 434 in the direction indicated by vehicle move direction 440A. Vehicle move direction 442A may indicate that a parking space for vehicle 432 may be created by way of moving vehicle 438 in the direction indicated by vehicle move direction 442A.

As discussed previously, a user may desire the ability to select a specific parking space out from one or more parking space candidates. It may be desirable to provide the user with an interface that is intuitive and easy for the user to understand. In at least one example embodiment, an apparatus receives information indicative of a parking space candidate selection input associated with a representation of a parking space candidate. In such an example embodiment, the identification of the parking space candidate as the parking space may be based, at least in part, on the parking space candidate selection input.

In some circumstances, a user may desire to avoid selecting a parking space candidate. For example, the user may desire to park as quickly as possible, may not have a preference for one parking space candidate over a different parking space candidate, and/or the like. In at least one example embodiment, an apparatus identifies a parking space candidate that corresponds with an unobstructed portion of the parking region. For example, the unobstructed portion of the parking region may be larger than a different unobstructed portion of the parking region, may be associated with another vehicle that less obstructed that a different vehicle, and/or the like. In such an example embodiment, the identification of the parking space candidate as the parking space may be based, at least in part, on correspondence of the parking space candidate with the unobstructed portion of the parking region.

In many circumstances, a user may desire to have the creation of a parking space in a parking region automated for the user, proceed in a manner that is convenient to the user and/or another user of another vehicle parked in the parking region, and/or the like. In at least one example embodiment, a parking space is created by way of a parking directive. The parking directive may, for example, comprise instructions that result in the creation of a parking space in a particular portion of a parking region.

In at least one example embodiment, an apparatus determines a parking directive based, at least in part, on a parking space candidate and configuration of a parking region. For example, the apparatus may determine the parking directive based, at least in part, on the parking space candidate and an object that is located within the parking region. For example, as illustrated in FIG. 4B, vehicle move direction 422A is indicative of a parking directive associated with vehicle 416 that indicates movement of vehicle 416 in the direction indicated by vehicle move direction 422A. In the example of FIG. 4C, vehicle move direction 440A is indicative of a parking directive associated with vehicle 434 that indicates movement of vehicle 434 in the direction indicated by vehicle move direction 440A.

In some circumstances, it may be desirable to direct the creation of a parking space, to direct the movement of a vehicle, and/or the like. For example, directing the creation of a parking space at a specific location in a parking region may cause movement of one or more vehicles, and directing the movement of a particular vehicle may cause that vehicle to move in the direction indicated. In at least one example embodiment, a parking directive instructs a vehicle to move within a parking region in accordance with the parking directive such that a parking space for a different vehicle is created within the parking region. Determination of the parking directive may be based, at least in part, on a determination that at least one object within a parking region is a vehicle that is movable. In some circumstances, there may be more than one object within a parking region. In such circumstances, identification of an object within the parking region may comprise identification of a plurality of objects within the parking region, and determination that at least one of the identified objects is another vehicle that is movable. In at least one example embodiment, determination of the parking directive comprises determination of a plurality of parking directives associated with creation of the parking space.

Once a parking space candidate is identified as the parking space, it may be desirable to determine a parking directive such that the portion of the parking region associated with the parking space candidate is expanded to be dimensioned as a parking space. In at least one example embodiment, determination of a parking directive is based, at least in part, on identification of a parking space candidate as the parking space.

In at least one example embodiment, a parking directive is a parking space creation directive. In such an example embodiment, an apparatus may determine a parking space creation directive based, at least in part, on identification of the parking space candidate as the parking space. For example, the parking space creation directive may indicate creation of a parking space at a position in the parking region at least partially corresponding with the parking space candidate.

In some circumstances, it may be desirable to create a parking space by way of directing a specific vehicle to move in a specific direction within a parking region. For example, it may be desirable to move the vehicle forward and into the shade of a tree, to avoid moving a different vehicle into a large puddle, and/or the like. In at least one example embodiment, a parking directive is a vehicle move directive. The vehicle move directive may comprise commands that cause another vehicle to move in conformance with the vehicle move directive. For example, the vehicle move directive may instruct that the other vehicle is moved in accordance with a vehicle move direction, a vehicle move distance, and/or the like. For example, the vehicle move direction may indicate forward, reverse, and/or the like, and the vehicle move distance may indicate a distance to move in the vehicle move direction. In at least one example embodiment, determination of a vehicle move directive occurs absent user action. For example, the vehicle move directive may be determined automatically, may be determined based, at least in part, on a parking space candidate selection input, and/or the like.

In at least one example embodiment, causation of sending a parking directive comprises causation of sending the vehicle move directive. For example, the vehicle move directive may be caused to be sent to a server, to a separate apparatus associated with another vehicle, to an electronic apparatus associated with a user of the other vehicle, and/or the like.

In some circumstances, a user may desire to avoid automatically moving a different user's vehicle without notifying the different user, without requesting the different user's permission, and/or the like. For example, the user may desire to request that the different user moves her vehicle to a different location, to request permission to move the different user's vehicle from the different user, and/or the like. In at least one example embodiment, a vehicle move directive comprises information indicative of a vehicle move request notification. The vehicle move request notification may comprise information indicative of a request of a user of another vehicle to move the other vehicle in conformance with the vehicle move directive.

In some circumstances, a user of a vehicle may desire to manually move another vehicle within a parking region. For example, the user may desire to specify an exact vehicle move direction, vehicle move distance, and/or the like. In at least one example embodiment, the apparatus determines a vehicle move directive associated with another vehicle based, at least in part, on a vehicle move directive input associated with the other vehicle. For example, the vehicle move directive input may be a drag input at a position corresponding with the other vehicle that indicates a vehicle move direction, a vehicle move distance, and/or the like. In at least one example embodiment, an apparatus receives information indicative of the vehicle move directive input associated with the other vehicle. In at least one example embodiment, the vehicle move directive input is indicative of a vehicle move direction, a vehicle move distance, and/or the like.

In some circumstances, it may be desirable to select a parking space candidate based, at least in part, on a level of reconfiguration required to create a parking space at a location corresponding with the parking space candidate. For example, creation of a parking space based on selection of a parking space candidate may cause movement of three other vehicles, and creation of a different parking space based on selection of a different parking space candidate may cause movement of only one other vehicle. In such an example, it may be desirable to select the different parking space candidate as the parking space based, at least in part, on the reduced complexity associated with creation of the parking space.

In at least one example embodiment, identification of the parking space candidate as the parking space comprises determination of a parking directive candidate associated with the parking space candidate. In such an example embodiment, identification of the parking space candidate as the parking space may be based, at least in part, on the parking directive candidate. For example, the parking directive candidate may indicate less movement than a different parking directive candidate associated with selection of a different parking space candidate.

In at least one example embodiment, an apparatus causes sending of a parking directive. For example, a parking directive may be caused to be sent to another vehicle, a separate apparatus associated with the other vehicle, an electronic apparatus associated with a user of the other vehicle, to a server, and/or the like. In at least one example embodiment, determination of a parking directive comprises determination of a plurality of parking directives. In such an example embodiment, causation of sending of the parking directive may comprise causation of sending of the plurality of parking directives. For example, parking directives may be caused to be sent to another vehicle and a different vehicle that are adjacent to a parking space candidate, to a different vehicle that is adjacent to another vehicle that is adjacent to the parking space candidate, and/or the like.

For example, in FIG. 4B, selection of parking space candidate 420 may cause sending of a vehicle move directive to vehicle 416 instructing vehicle 416 to move in the direction indicated by vehicle move direction 420B and to vehicle 418 instructing vehicle 418 to move in the direction indicated by vehicle move direction 422B, such that both vehicle 416 and vehicle 418 move in the same direction to create the parking space. In another example, in FIG. 4B, selection of parking space candidate 420 may cause sending of a vehicle move directive to vehicle 416 instructing vehicle 416 to move in the direction indicated by vehicle move direction 420B and to vehicle 414 instructing vehicle 414 to move in the direction indicated by vehicle move direction 420A, such that vehicle 416 and vehicle 414 move in opposite directions to create the parking space.

In many situations, a user may desire to perceive a visual indication that a parking space is being created for the user's vehicle. For example, to ensure that the parking space is being created, that vehicles within the parking region are being reconfigured, that a parking space will be able to be created within the parking region, and/or the like, the user may desire to perceive an indication that the parking space is being created. In at least one example embodiment, an apparatus causes display of a representation of a parking assistance wait notification based, at least in part, on the causation of sending of the parking directive. The parking assistance wait notification may be a notification that prompts a user of the vehicle to standby for creation of the parking space, that the parking space is being created, that one or more vehicles are being moved, and/or the like.

Figure 4D:
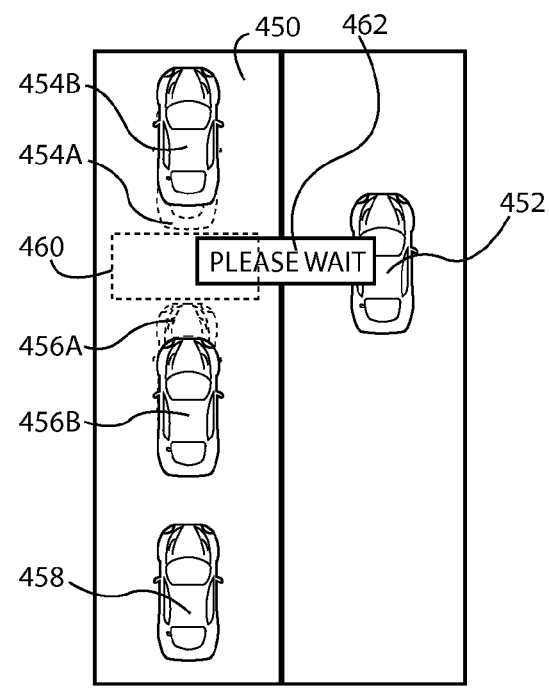

FIG. 4D is a diagram illustrating a representation of a parking assistance wait notification in relation to a parking assistance interface according to at least one example embodiment. The example of FIG. 4D depicts the scenario of FIG. 4B subsequent to selection of parking space candidate 420. For example, portion 460 of FIG. 4D corresponds with a position indicated by parking space candidate 420 of FIG. 4B. In the example of FIG. 4D, vehicle 454A corresponds with vehicle 414 of FIG. 4B, and vehicle 456A corresponds with vehicle 416 of FIG. 4B. In the example of FIG. 4D, the position of vehicle 454B indicates a new position of vehicle 454A, and the position of vehicle 456B indicates a new position of vehicle 456A. In the example of FIG. 4D, vehicle 458 corresponds with vehicle 418 of FIG. 4B, and remains at the same position relative to parking region 450. In the example of FIG. 4D, portion 460 is dimensioned smaller than a parking space such that vehicle 452 may not park in portion 460 of parking region 450. In the example of FIG. 4D, vehicles 454B and 456B are being repositioned such that portion 460 is being dimensioned as a parking space for vehicle 452. Parking assistance wait notification 462 is displayed in relation to the parking assistance interface depicted in FIG. 4D. In the example of FIG. 4D, parking assistance wait notification 462 is caused to be displayed based, at least in part, on the undertaking of creation of a parking space at a position corresponding with portion 460.

In many situations, a user may desire to perceive a visual indication that a parking space has been successfully created for the user's vehicle. For example, in order to avoid interrupting the creation of the parking space, to determine when to park in the parking space, and/or the like, the user may desire to perceive an indication that the parking space has been created. In at least one example embodiment, an apparatus determines that a parking space has been created. The determination that the parking space has been created may be based, at least in part, on information indicative of creation of the parking space, visual information indicative of creation of the parking space, and/or the like. In at least one example embodiment, an apparatus receives information indicative of creation of the parking space. For example, the apparatus may receive information indicative of creation of the parking space from a server, from another vehicle, from a separate apparatus associated with the other vehicle, from an electronic apparatus associated with a user of the other vehicle, and/or the like. In at least one example embodiment, the information indicative of creation of the parking space is visual information indicative of the parking space. The information indicative of creation of the parking space may be received from a camera module, from a server, and/or the like. For example, determination that a parking space has been created may be based, at least in part, on a location of one or more other vehicles that were caused to be moved in accordance with one or more parking directives.

In at least one example embodiment, an apparatus causes display of a representation of a parking assistance park notification based, at least in part, on a determination that a parking space has been created. The parking assistance park notification may be a notification that prompts a user of a vehicle to park the vehicle in the parking space. In some circumstances, a user may desire that the user's vehicle utilize an assisted parking functionality, automated parking functionality, and/or the like, to engage such that the user's vehicle is parked in the parking space. In at least one example embodiment, an apparatus causes parking of the vehicle in the parking space based, at least in part, on the determination that the parking space has been created. For example, the apparatus may cause actuation of an automated parking functionality, invocation of an assisted parking functionality, and/or the like. In at least one example embodiment, causation of parking of the vehicle in the parking space comprises causation of maneuvering of the vehicle such that the vehicle is maneuvered into a position in the parking region that corresponds with the parking space.

Figure 4E:
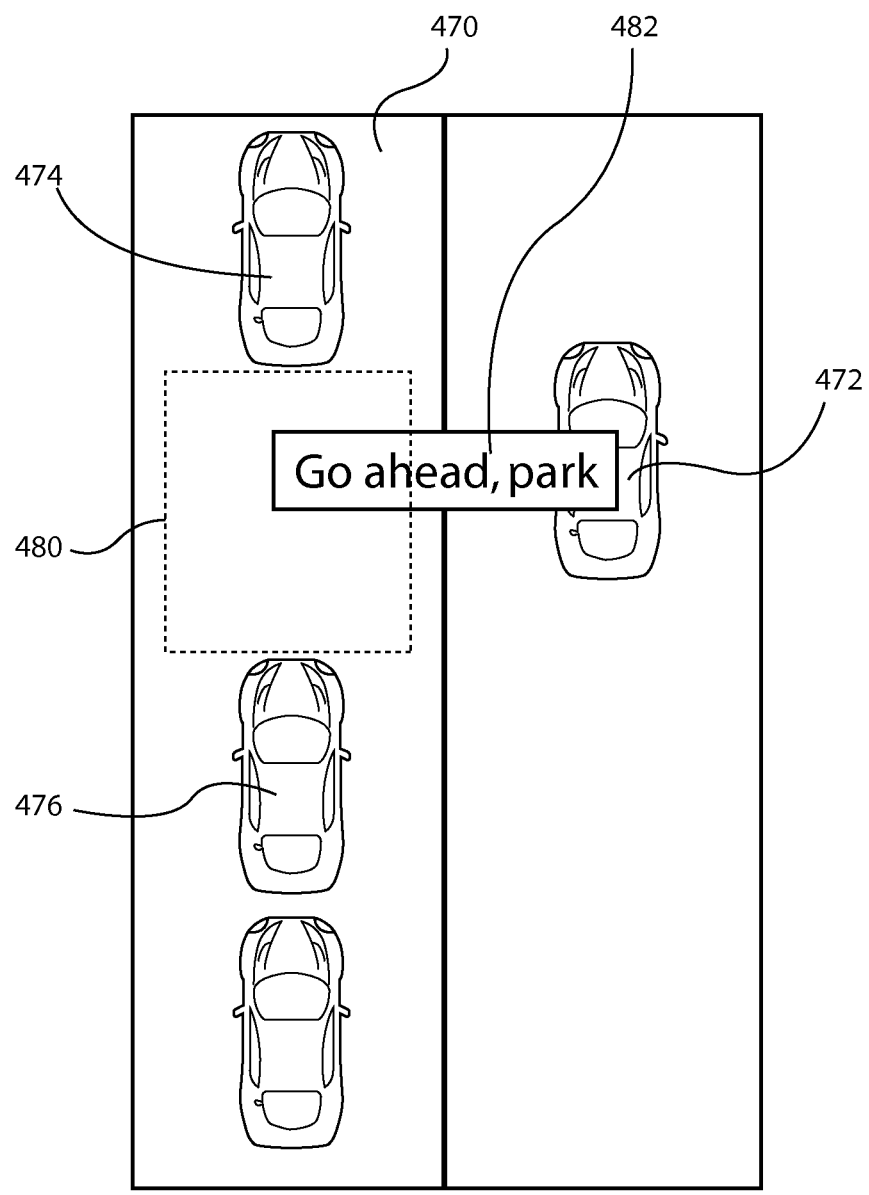

FIG. 4E is a diagram illustrating a representation of a parking assistance park notification in relation to a parking assistance interface according to at least one example embodiment. The example of FIG. 4E depicts the scenario of FIG. 4D subsequent to creation of a parking space corresponding with portion 460. In the example of FIG. 4E, vehicle 474 and 476 are parked in parking region 470. Vehicle 474 corresponds with vehicle 454B of FIG. 4D, and vehicle 476 corresponds with vehicle 456B of FIG. 4D. In the example of FIG. 4E, parking space 480 is shown at a position corresponding with portion 460 of FIG. 4D. Parking space 480 is dimensioned such that vehicle 472 may enter parking space 480, leave parking space 480, and/or the like. Parking assistance park notification 482 is displayed in relation to the parking assistance interface depicted in FIG. 4E. In the example of FIG. 4E, parking assistance park notification 482 is caused to be displayed based, at least in part, on the successful creation of parking space 480. Based on the successful creation of parking space 480, a user of vehicle 472 may maneuver vehicle 472 into parking space 480, vehicle 472 may be caused to be parked in parking space 480, and/or the like.

Figure 5B:
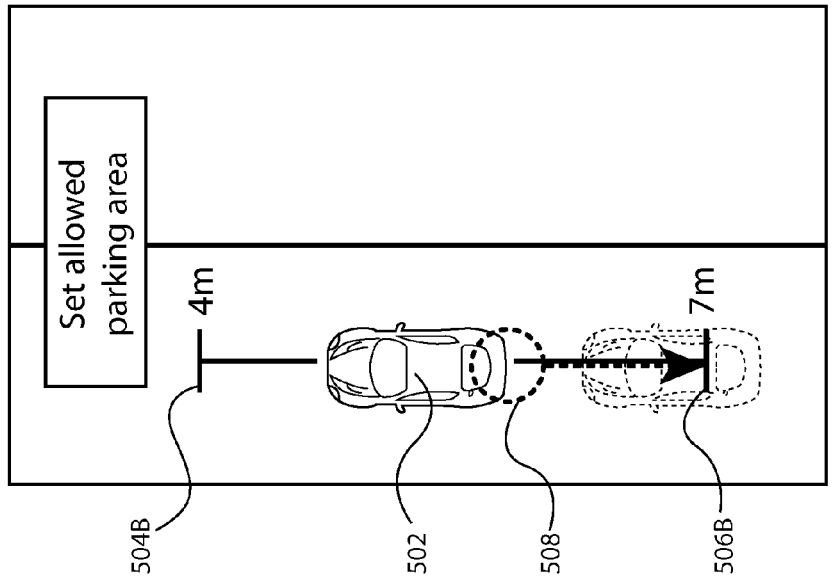
FIGS. 5A-5B are diagrams illustrating setting of a vehicle move range according to at least one example embodiment.
Figure 5A:
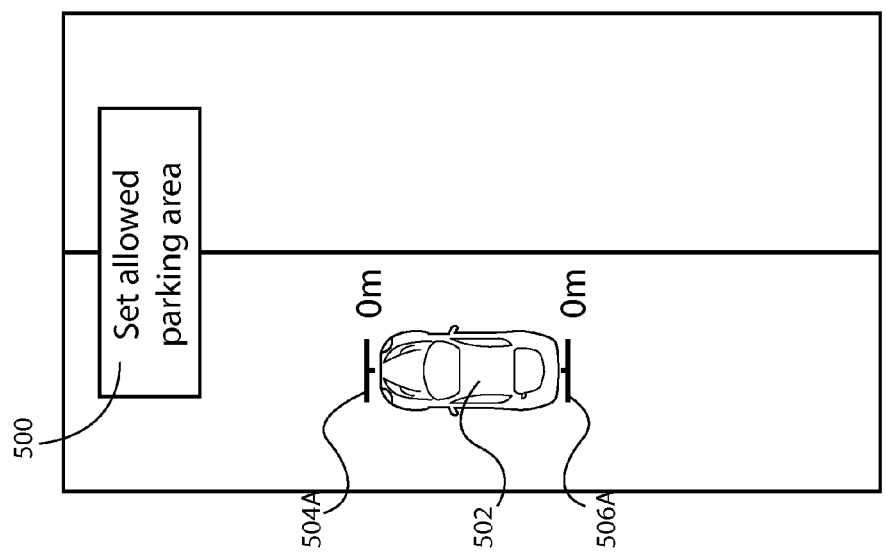

FIGS. 5A-5B are diagrams illustrating setting of a vehicle move range according to at least one example embodiment. The examples of FIGS. 5A-5B are merely examples and do not limit the scope of the claims. For example, representations may vary, vehicle move range may vary, parking assistance interface configuration may vary, and/or the like.

As discussed previously, in many circumstances, a user may desire to limit an amount that the user's vehicle can be moved during creation of a parking space for another vehicle. For example, the user may desire to place restrictions on a direction of movement, a distance of movement, and/or the like. It may be desirable to permit a user to set an allowable range of movement associated with the user's vehicle in an intuitive manner. In at least one example embodiment, an apparatus causes display of a representation of a vehicle move range. In such an example embodiment, the apparatus may receive information indicative of a change of at least part of the representation of the vehicle move range. The apparatus may cause setting of the part of the vehicle move range based, at least in part, on the change of the part of the representation of the vehicle move range. For example, a part of a vehicle move range may indicate a vehicle move direction, a different vehicle move direction, a vehicle move distance in the vehicle move direction, a different vehicle move distance in the different vehicle move direction, and/or the like. In at least one example embodiment, a part of the vehicle move range indicates at least one of a vehicle move direction or a vehicle move distance. For example, a part of the vehicle move range may indicate a vehicle move distance along a vehicle move direction, and a different part of the vehicle move range may indicate a different vehicle move distance along a different vehicle move direction. In at least one example embodiment, the information indicative of the change of at least part of the representation of the vehicle move range is a drag input associated with the part of the representation of the vehicle move range that indicates a change to at least part of the vehicle move range.

In order to facilitate dissemination of and/or creation of parking spaces in accordance with a vehicle move range, it may be desirable to communicate the vehicle move range to a server, to another vehicle, and/or the like. In at least one example embodiment, an apparatus causes sending of information indicative of a vehicle move range. For example, the apparatus may cause sending of information indicative of the vehicle move range to a server, to a client, to another vehicle, to a separate apparatus associated with the vehicle, to an electronic apparatus associated with a user of the other vehicle, and/or the like.

FIG. 5A is a diagram illustrating setting of a vehicle move range according to at least one example embodiment. The example of FIG. 5A depicts a parking assistance interface configured to permit setting of a vehicle move range. In the example of FIG. 5A, vehicle 502 is associated with vehicle move range 504A and 506A. Vehicle move ranges 504A and 506A may be parts of a vehicle move range, individual move ranges, and/or the like. In the example of FIG. 5A, vehicle move range 504A indicates that vehicle 502 is permitted to move zero meters in a direction that is to the front of vehicle 502, and vehicle move range 506A indicates that vehicle 502 is permitted to move zero meters in a direction that is to the rear of vehicle 502. The vehicle move range depicted in FIG. 5A may, for example, be a default vehicle move range, a vehicle move range prohibiting movement of vehicle 502 for purposes relating to creation of a parking space, and/or the like. In the example of FIG. 5A, notification 500 is a vehicle move range notification. In at least one example embodiment, a vehicle move range notification comprises information that prompts a user of a vehicle to set a vehicle move range for the vehicle.

FIG. 5B is a diagram illustrating setting of a vehicle move range according to at least one example embodiment. The example of FIG. 5B depicts the scenario of FIG. 5A subsequent to receipt of information indicative of a change of at least part of the representation of the vehicle move range. For example, the apparatus may have received information indicative of a drag input indicative of dragging the representation of vehicle move range 504A from the position depicted in FIG. 5A to the position of vehicle move range 504B in FIG. 5B. The apparatus may have received information indicative of another drag input indicative of dragging the representation of vehicle move range 506A from the position depicted in FIG. 5A to the position of vehicle move range 506B in FIG. 5B. In the example of FIG. 5B, vehicle move range 504B indicates that vehicle 502 is permitted to move up to four meters in a direction that is to the front of vehicle 502, and vehicle move range 506B indicates that vehicle 502 is permitted to move up to seven meters in a direction that is to the rear of vehicle 502. In this manner, vehicle 502 may be caused to be moved within an eleven meter vehicle move range in order to facilitate creation of a parking space in a parking region for another vehicle.

Figure 6A:
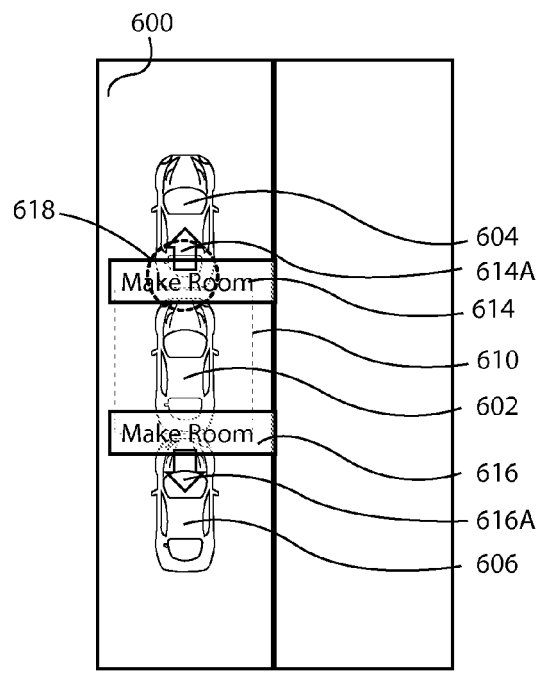
FIGS. 6A-6C are diagrams illustrating a parking assistance interface according to at least one example embodiment.
Figure 6B:
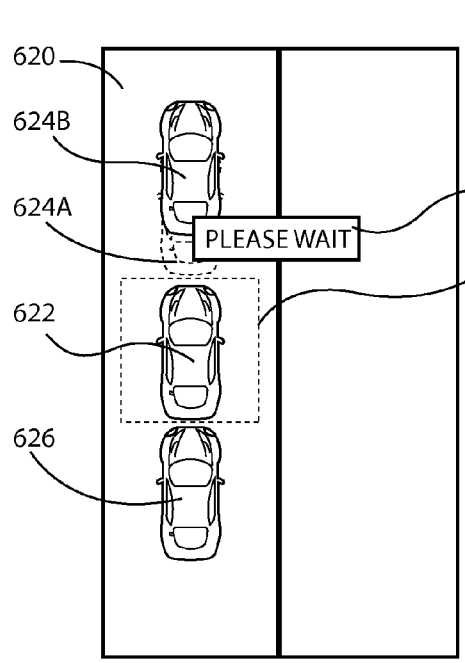
Figure 6C:
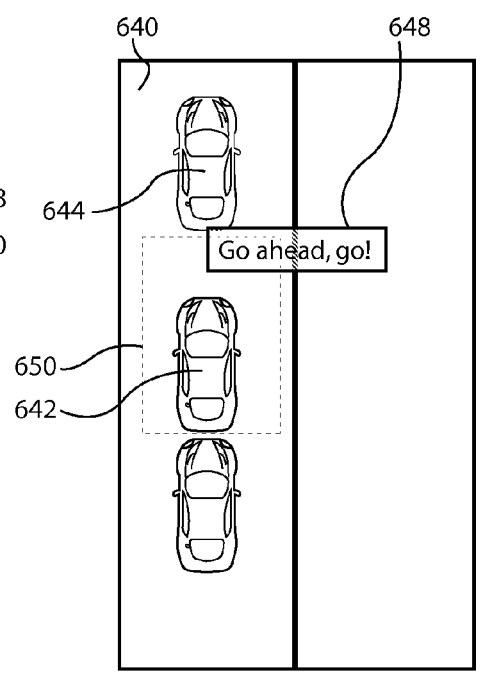

FIGS. 6A-6C are diagrams illustrating a parking assistance interface according to at least one example embodiment. The examples of FIGS. 6A-6C are merely examples and do not limit the scope of the claims. For example, parking region configuration may vary, parking space configuration may vary, vehicle count may vary, parking assistance interface configuration may vary, and/or the like.

In many situations, it may be desirable to permit a vehicle that has been blocked into a parking space to exit the parking space. For example, a vehicle may park in a parking space. Subsequently, another vehicle may park adjacent to the vehicle such that the vehicle has inadequate room to exit the parking space. In such an example, it may be desirable to expand the portion of the parking region occupied by the vehicle such that the portion of the parking region is dimensioned as a parking space such that the vehicle has adequate room to exit the parking space.

In at least one example embodiment, an apparatus determines that a portion of the parking region in which the vehicle is parked is dimensioned smaller than a parking space. In such an example embodiment, the apparatus may determine a different parking directive that identifies the portion of the parking region to expand such that the portion of the parking region is dimensioned as a parking space, and cause sending of the different parking directive. For example, a vehicle may park in a parking space dimensioned such that the vehicle may enter and/or leave the parking space. Subsequently, another vehicle may encroach into a portion of the parking region corresponding with the vehicle's parking space such that the vehicle no longer has sufficient space to leave the parking space. In at least one example embodiment, an apparatus determines a parking directive to enlarge the portion of the parking region occupied by the vehicle such that the portion of the parking region is dimensioned as a parking space, and the vehicle may leave the parking space. In at least one example embodiment, an apparatus causes display of a representation of a parking assistance wait notification in relation to a parking assistance interface based, at least in part, on creation of a parking space around a position corresponding with the vehicle. In at least one example embodiment, the apparatus may display a representation of a parking space candidate, similar as described regarding FIGS. 4A-4E.

FIG. 6A is a diagram illustrating a parking assistance interface according to at least one example embodiment. In the example of FIG. 6A, vehicle 602 initially parked in a parking space in parking region 600. Subsequent to vehicle 602 parking in the parking space, the parking space was reduced to the size of portion 610. For example, vehicle 604 and/or vehicle 606 may have parked at a position within parking region 600 that encroached into the portion of parking region 600 corresponding with the parking space. Parking space candidates 614 and 616 are representations of two parking space candidates that are adjacent to vehicle 602. Parking space candidates 614 and 616 may indicate parking space candidates that a user may select and/or identify as the parking space, such that the portion of parking region 600 occupied by vehicle 610 is expanded such that vehicle 610 may exit the parking region. Parking space candidate 614 comprises vehicle move direction 614A, and parking space candidate 616 comprises vehicle move direction 616A. In the example of FIG. 6A, parking space candidate selection input 618 indicates selection of parking space candidate 614 as the parking candidate.

FIG. 6B is a diagram illustrating a representation of a parking assistance wait notification in relation to a parking assistance interface according to at least one example embodiment. The example of FIG. 6B illustrates the scenario depicted in FIG. 6A subsequent to receipt of parking space candidate selection input 618 indicative of selection of parking space candidate 614 as the parking space. In the example of FIG. 6B, vehicle 604 of FIG. 6A corresponds with vehicle 624A and vehicle 624B. In the example of FIG. 6B, vehicle 624B moved to the position illustrated from a position corresponding with vehicle 624A based, at least in part, on parking space candidate selection input 618 of FIG. 6A indicative of selection of parking space candidate 614 as the parking space. As such, vehicle 604 of FIG. 6A was caused to move in the direction indicated by vehicle move direction 614A such that portion 630 of parking region 620 is expanded such that vehicle 622 may exit the parking region. In the example of FIG. 6B, parking assistance wait notification 628 is displayed in relation to the parking assistance interface, and prompts a user of vehicle 622 to wait for creation of the parking space.

FIG. 6C is a diagram illustrating a representation of a parking assistance leave notification in relation to a parking assistance interface according to at least one example embodiment. The example of FIG. 6C illustrates the scenario depicted in FIG. 6B subsequent to creation of parking space 650 around vehicle 642. For example, portion 630 of FIG. 6B was caused to be expanded such that parking space 650 was created in parking region 640. In the example of FIG. 6C, parking space 650 is dimensioned such that vehicle 642 may leave parking space 650, parking region 640, and/or the like. In the example of FIG. 6C, parking assistance leave notification 648 is displayed in relation to the parking assistance interface, and prompts a user of vehicle 642 that the parking space has been created, that the user may maneuver vehicle 642 out of parking space 650, and/or the like.

Figure 7:
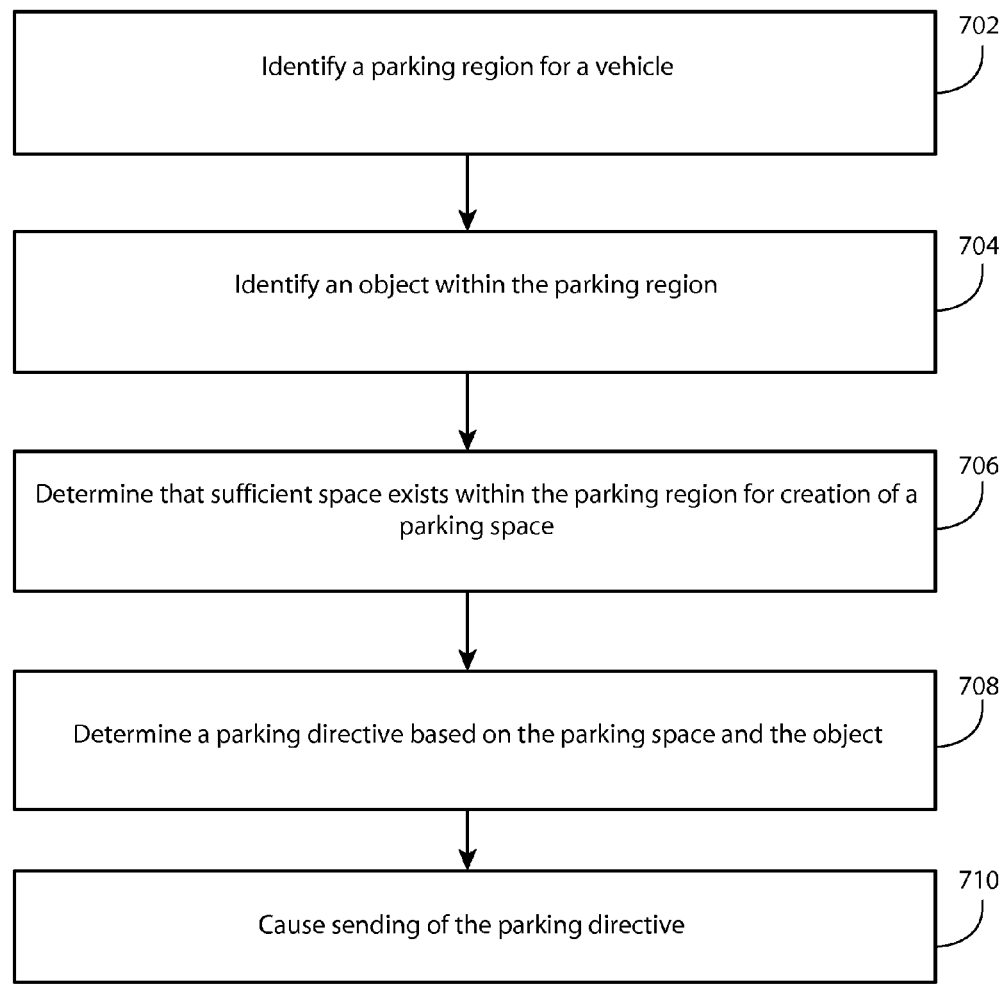
FIG. 7 is a flow diagram illustrating activities associated with causing sending of a parking directive according to at least one example embodiment.

FIG. 7 is a flow diagram illustrating activities associated with causing sending of a parking directive according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus identifies a parking region for a vehicle. The identification, the parking region, and the vehicle may be similar as described regarding FIG. 2, FIGS. 3A-3C, and FIGS. 4A-4E.

At block 704, the apparatus identifies an object within the parking region. The identification and the object may be similar as described regarding FIG. 2, FIGS. 3A-3C, and FIGS. 4A-4E.

At block 706, the apparatus determines that sufficient space exists within the parking region for creation of a parking space. In at least one example embodiment, the parking space is a portion of the parking region that is dimensioned to allow the vehicle to enter the parking space and exit the parking space. The determination, the sufficient space, the parking space, and the creation of the parking space may be similar as described regarding FIG. 2, FIGS. 3A-3C, FIGS. 4A-4E, FIGS. 5A-5B, and FIGS. 6A-6C.

At block 708, the apparatus determines a parking directive based, at least in part, on the parking space and the object. The determination and the parking directive may be similar as described regarding FIGS. 3A-3C, FIGS. 4A-4E, and FIGS. 5A-5B.

At block 710, the apparatus causes sending of the parking directive. The causation and the sending of the parking directive may be similar as described regarding FIG. 2 and FIGS. 4A-4E.

Figure 8:
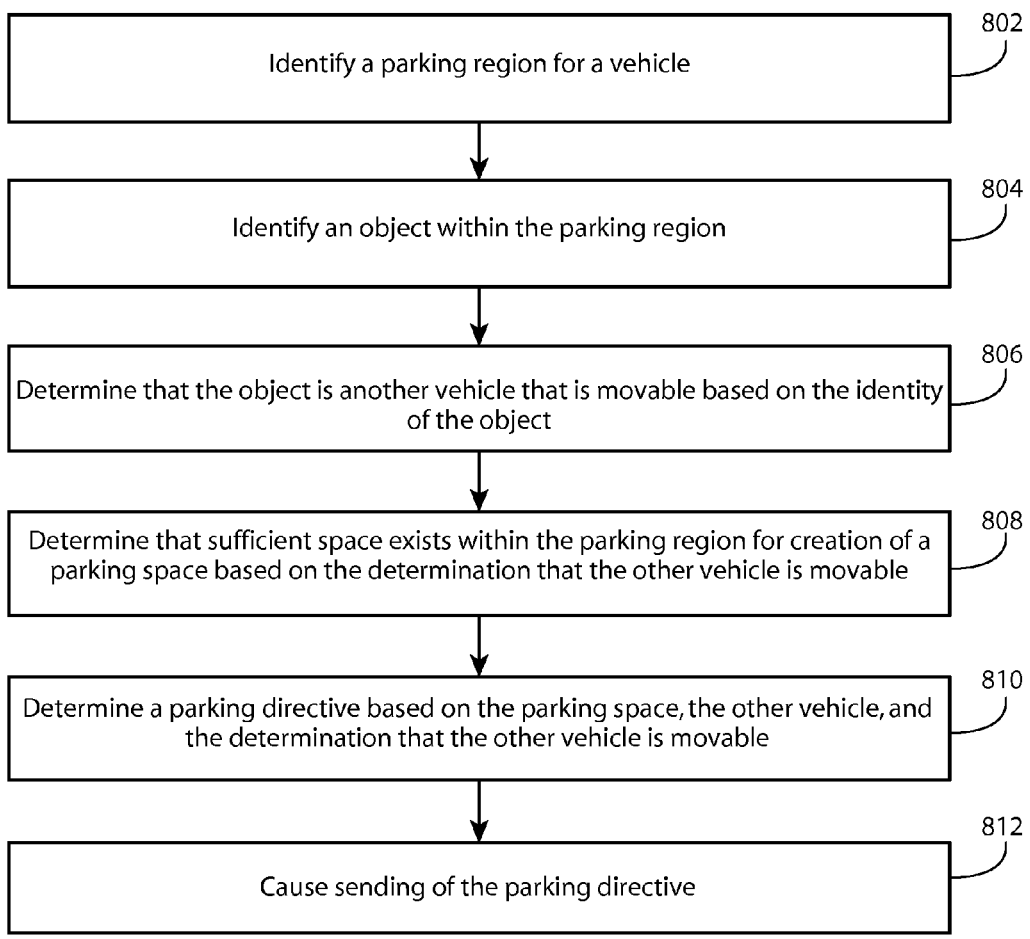
FIG. 8 is a flow diagram illustrating activities associated with causing sending of a parking directive according to at least one example embodiment.

FIG. 8 is a flow diagram illustrating activities associated with causing sending of a parking directive according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many circumstances, it may be desirable to create a parking space by way of moving of another vehicle. In such circumstances, it may be desirable to determine a parking directive based, at least in part, on the determination that the other vehicle is movable. For example, in the presence of a first car that is not movable and a second car that is movable, it may be desirable to determine a parking directive based, at least in part, on the determination that the first vehicle is movable.

At block 802, the apparatus identifies a parking region for a vehicle. The identification, the parking region, and the vehicle may be similar as described regarding FIG. 2, FIGS. 3A-3C, and FIGS. 4A-4E.

At block 804, the apparatus identifies an object within the parking region. The identification and the object may be similar as described regarding FIG. 2, FIGS. 3A-3C, and FIGS. 4A-4E.

At block 806, the apparatus determines that the object is another vehicle that is movable based, at least in part, on the identity of the object. The determination, the other vehicle, and the movability of the other vehicle may be similar as described regarding FIG. 2, FIGS. 3A-3C, FIGS. 4A-4E, and FIGS. 5A-5B.

At block 808, the apparatus determines that sufficient space exists within the parking region for creation of a parking space based, at least in part, on the determination that the other vehicle is movable. In at least one example embodiment, the parking space is a portion of the parking region that is dimensioned to allow the vehicle to enter the parking space and exit the parking space. The determination, the sufficient space, the parking space, and the creation of the parking space may be similar as described regarding FIG. 2, FIGS. 3A-3C, FIGS. 4A-4E, FIGS. 5A-5B, and FIGS. 6A-6C.

At block 810, the apparatus determines a parking directive based, at least in part, on the parking space, the other vehicle, and the determination that the other vehicle is movable. The determination and the parking directive may be similar as described regarding FIGS. 3A-3C, FIGS. 4A-4E, and FIGS. 5A-5B.

At block 812, the apparatus causes sending of the parking directive. The causation and the sending of the parking directive may be similar as described regarding FIG. 2 and FIGS. 4A-4E.

Figure 9:
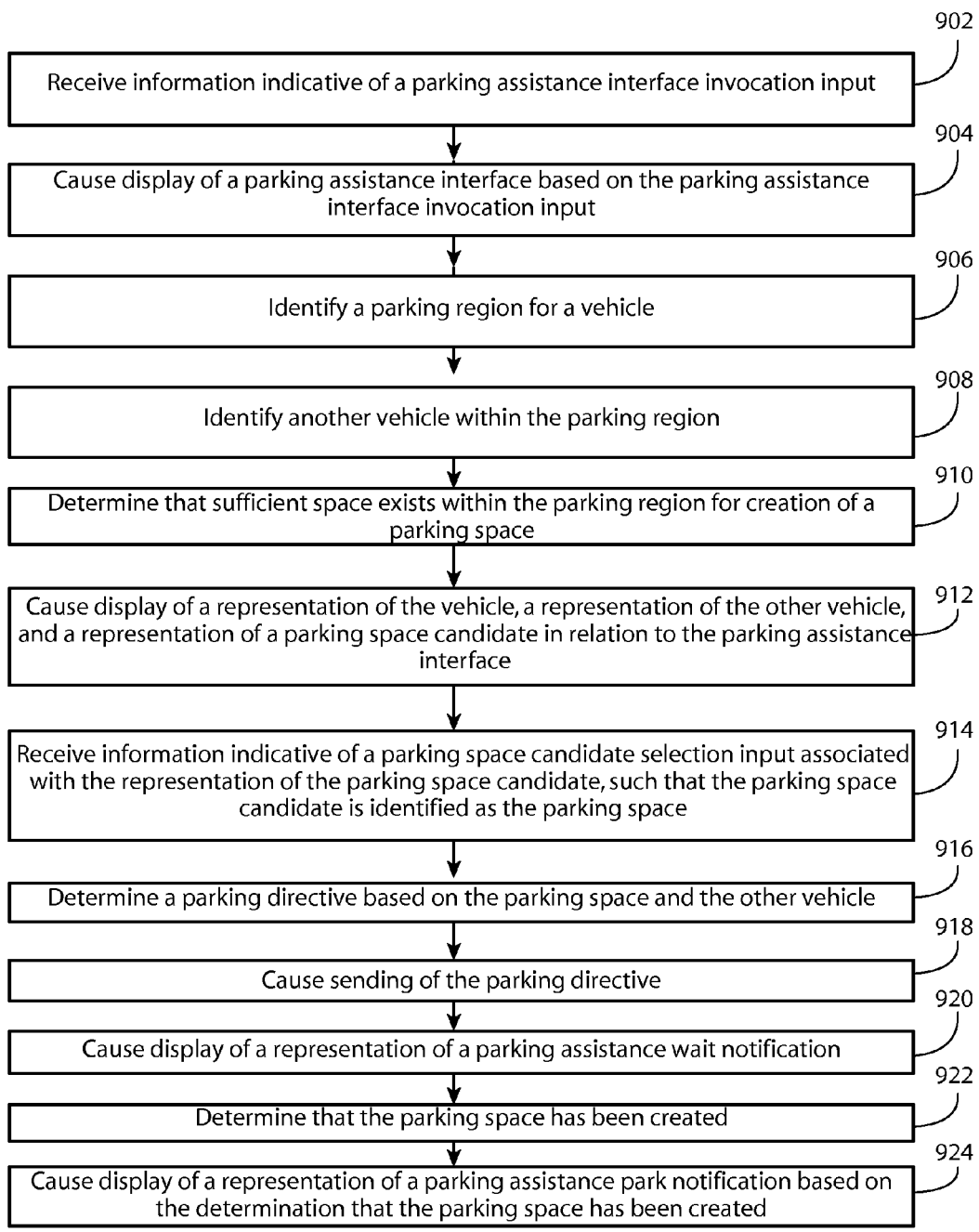
FIG. 9 is a flow diagram illustrating activities associated with causing sending of a parking directive according to at least one example embodiment.

FIG. 9 is a flow diagram illustrating activities associated with causing sending of a parking directive according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus receives input indicative of a parking assistance interface invocation input. The receipt and the parking assistance interface invocation input may be similar as described regarding FIG. 2 and FIGS. 4A-4E.

At block 904, the apparatus causes display of a representation of a parking assistance interface based, at least in part, on the parking assistance interface invocation input. The causation, the display, the parking assistance interface, and the representation of the parking assistance interface may be similar as described regarding FIG. 2 and FIGS. 4A-4E.

At block 906, the apparatus identifies a parking region for a vehicle. The identification, the parking region, and the vehicle may be similar as described regarding FIG. 2, FIGS. 3A-3C, and FIGS. 4A-4E.

At block 908, the apparatus identifies another vehicle within the parking region. In at least one example embodiment, identification of the other vehicle within the parking region comprises identification of an object within the parking region, and determination that the object is another vehicle that is movable. The identification, the object, the other vehicle, and the movability of the other vehicle may be similar as described regarding FIG. 2, FIGS. 3A-3C, FIGS. 4A-4E, and FIGS. 5A-5B.

At block 910, the apparatus determines that sufficient space exists within the parking region for creation of a parking space. In at least one example embodiment, the parking space is a portion of the parking region that is dimensioned to allow the vehicle to enter the parking space and exit the parking space. The determination, the sufficient space, the parking space, and the creation of the parking space may be similar as described regarding FIG. 2, FIGS. 3A-3C, FIGS. 4A-4E, FIGS. 5A-5B, and FIGS. 6A-6C.

At block 912, the apparatus causes display of a representation of the vehicle, a representation of the other vehicle, and a representation of a parking space candidate in relation to the representation of the parking assistance interface. The causation, the display, the representation of the vehicle, the representation of the other vehicle, the parking space candidate, and the representation of the parking space candidate may be similar as described regarding FIGS. 3A-3C, FIGS. 4A-4E, and FIGS. 5A-5B.

At block 914, the apparatus receives information indicative of a parking space candidate selection input associated with the representation of the parking space candidate such that the parking space candidate is identified as the parking space. The receipt, the parking space candidate selection input, and the identification of the parking space may be similar as described regarding FIGS. 4A-4E.

At block 916, the apparatus determines a parking directive based, at least in part, on the parking space and the other vehicle. The determination and the parking directive may be similar as described regarding FIGS. 3A-3C, FIGS. 4A-4E, and FIGS. 5A-5B.

At block 918, the apparatus causes sending of the parking directive. The causation and the sending of the parking directive may be similar as described regarding FIG. 2 and FIGS. 4A-4E.

At block 920, the apparatus causes display of a representation of a parking assistance wait notification in relation to the representation of the parking assistance interface based, at least in part, on the causation of sending of the parking directive. The causation, the display, the parking assistance wait notification, and the representation of the parking assistance wait notification may be similar as described regarding FIG. 2 and FIGS. 4A-4E.

At block 922, the apparatus determines that the parking space has been created. The determination and the creation of the parking space may be similar as described regarding FIG. 2 and FIGS. 4A-4E.

At block 924, the apparatus causes display of a representation of a parking assistance park notification in relation to the representation of the parking assistance interface based, at least in part, on the determination that the parking space has been created. The causation, the display, the parking assistance park notification, and the representation of the parking assistance park notification may be similar as described regarding FIG. 2 and FIGS. 4A-4E.

Figure 10:
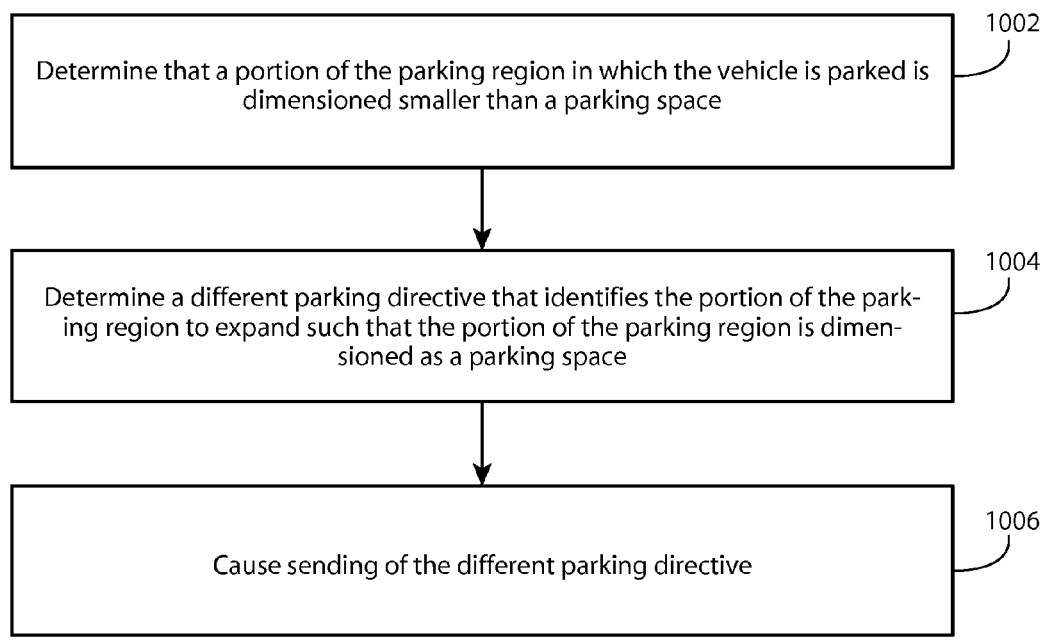
FIG. 10 is a flow diagram illustrating activities associated with causing sending of a parking directive according to at least one example embodiment.

FIG. 10 is a flow diagram illustrating activities associated with causing sending of a parking directive according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in many situations, it may be desirable to permit a vehicle that has been blocked into a parking space to exit the parking space. For example, a vehicle may park in a parking space. Subsequently, another vehicle may park adjacent to the vehicle such that the vehicle has inadequate room to exit the parking space. In such an example, it may be desirable to expand the portion of the parking region occupied by the vehicle such that the portion of the parking region is dimensioned as a parking space such that the vehicle has adequate room to exit the parking space.

Although the activities illustrated in FIG. 10 are illustrated in isolation, the activities illustrated in FIG. 10 may be preceded by the activities illustrated in FIG. 7, FIG. 8, or FIG. 9.

At block 1002, the apparatus determines that a portion of the parking region in which the vehicle is parked is dimensioned smaller than a parking space. The determination, the portion of the parking region, and the parking space may be similar as described regarding FIGS. 3A-3C, FIGS. 4A-4E, and FIGS. 6A-6C.

At block 1004, the apparatus determines a different parking directive that identifies the portion of the parking region to expand such that the portion of the parking region is dimensioned as a parking space. The determination, the different parking directive, and the expansion of the parking region may be similar as described regarding FIGS. 3A-3C, FIGS. 4A-4E, FIGS. 5A-5B, and FIGS. 6A-6C.

At block 1006, the apparatus causes sending of the different parking directive. The causation and the sending of the different parking directive may be similar as described regarding FIG. 2, FIGS. 4A-4E, and FIGS. 6A-6C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, blocks 902 and 904 of FIG. 9 may be performed after block 906 of FIG. 9. Furthermore, if desired, one or more of the above-described functions may be optional and/or may be combined. For example, block 806 of FIG. 8 may be optional and/or combined with block 804 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
identifying a parking region for a vehicle;
identifying an object within the parking region;
determining whether the object is another vehicle that is movable or another vehicle that is not movable based, at least in part, on an identity of the another vehicle;
determining, with a processor of an electronic apparatus, that sufficient space exists within the parking region for creation of a parking space, the parking space being a portion of the parking region that is dimensioned to allow the vehicle to enter the parking space and exit the parking space, wherein determining that sufficient space exists within the parking region for creation of the parking space is based, at least in part, on the determination that the another vehicle is movable;
causing, via a display, display of a representation of a parking space candidate in relation to a representation of a parking assistance interface, the representation of the parking space candidate indicating a location of the parking space location in relation to the parking region;
receiving information indicative of a parking space candidate selection input associated with the representation of the parking space candidate;
identifying the parking space candidate as the parking space based, at least in part, on the parking space candidate selection input;
determining a parking directive based, at least in part, on the parking space, the object, and the identification of the parking space candidate as the parking space; and
sending the parking directive to cause the another vehicle to move to create the parking space.

2. The method of claim 1, wherein the object is another vehicle that is movable, and the parking directive is at least one of a parking space creation directive or a vehicle move directive.

3. The method of claim 1, further comprising
receiving input indicative of a parking assistance interface invocation input; and
causing display of the representation of the parking assistance interface based, at least in part, on the parking assistance interface invocation input.

4. The method of claim 1, wherein the identification of the object within the parking region is based, at least in part, on object identification data.

5. The method of claim 1, further comprising:
causing display of a representation of a vehicle move range;
receiving information indicative of a change of the representation of the vehicle move range; and
setting of the vehicle move range based, at least in part, on the change of the representation of the vehicle move range.

6. The method of claim 1, further comprising:
- determining that the portion of the parking region in which the vehicle to be parked is dimensioned smaller than the parking space; and
- determining a different parking directive that identifies the portion of the parking region to expand such that the portion of the parking region is dimensioned as the parking space.

7. The method of claim 1 wherein determining whether another vehicle is movable comprises reviewing a response to a database query in which the identities of vehicles are associated with movability information.

8. The method of claim 7 wherein the response to the database query also includes a vehicle move range that has been stored in associated with the movability information.

9. An apparatus comprising at least one processor and at least one memory, the memory comprising machine-readable instructions, that when executed cause the apparatus to:
- identify a parking region for a vehicle;
- identify an object within the parking region;
- determine whether the object is another vehicle that is movable or another vehicle that is not movable based, at least in part, on an identity of the another vehicle;
- determine that sufficient space exists within the parking region for creation of a parking space, the parking space being a portion of the parking region that is dimensioned to allow the vehicle to enter the parking space and exit the parking space, wherein the determination that sufficient space exists within the parking region for creation of the parking space is based, at least in part, on the determination that the another vehicle is movable;
- display a representation of a parking space candidate in relation to a representation of a parking assistance interface, the representation of the parking space candidate indicating a location of the parking space location in relation to the parking region;
- receive information indicative of a parking space candidate selection input associated with the representation of the parking space candidate;
- identify the parking space candidate as the parking space based, at least in part, on the parking space candidate selection input;
- determine a parking directive based, at least in part, on the parking space, the object, and the identification of the parking space candidate as the parking space; and
- send the parking directive to cause the another vehicle to move to create the parking space.

10. The apparatus of claim 9, wherein the object is another vehicle that is movable, and the parking directive is at least one of a parking space creation directive or a vehicle move directive.

11. The apparatus of claim 9, wherein the apparatus is further caused to:
- receive input indicative of a parking assistance interface invocation input; and
- display of the representation of the parking assistance interface based, at least in part, on the parking assistance interface invocation input.

12. The apparatus of claim 9, wherein the identification of the object within the parking region is based, at least in part, on object identification data.

13. The apparatus of claim 9, wherein the apparatus is further caused to:
- display of a representation of a vehicle move range;
- receive information indicative of a change of the representation of the vehicle move range; and
- set of the vehicle move range based, at least in part, on the change of the representation of the vehicle move range.

14. The apparatus of claim 9, wherein the apparatus is further caused to:
- determine that the portion of the parking region in which the vehicle is parked is dimensioned smaller than the parking space; and
- determine a different parking directive that identifies the portion of the parking region to expand such that the portion of the parking region is dimensioned as the parking space.

15. The apparatus of claim 9, wherein the apparatus comprise a display.

16. The apparatus of claim 9 wherein the apparatus is caused to determine whether another vehicle is movable by reviewing a response to a database query in which the identities of vehicles are associated with movability information.

17. The apparatus of claim 16 wherein the response to the database query also includes a vehicle move range that has been stored in associated with the movability information.

18. At least one non-transitory computer readable medium comprising instructions, when executed by a computer, perform:
- identifying a parking region for a vehicle;
- identifying an object within the parking region;
- determining whether the object is another vehicle that is movable or another vehicle that is not movable based, at least in part, on an identity of the another vehicle;
- determining that sufficient space exists within the parking region for creation of a parking space, the parking space being a portion of the parking region that is dimensioned to allow the vehicle to enter the parking space and exit the parking space, wherein determining that sufficient space exists within the parking region for creation of the parking space is based, at least in part, on the determination that the another vehicle is movable;
- causing display a representation of a parking space candidate in relation to a representation of a parking assistance interface, the representation of the parking space candidate indicating a location of the parking space location in relation to the parking region;
- receiving information indicative of a parking space candidate selection input associated with the representation of the parking space candidate;
- identifying the parking space candidate as the parking space based, at least in part, on the parking space candidate selection input;
- determining a parking directive based, at least in part, on the parking space, the object, and the identification of the parking space candidate as the parking space; and
- sending the parking directive to cause the another vehicle to move to create the parking space.

19. The non-transitory computer readable medium of claim 18, further comprising:
- receiving input indicative of a parking assistance interface invocation input; and
- causing display of the representation of the parking assistance interface based, at least in part, on the parking assistance interface invocation input.

* * * * *